US011330287B2

(12) United States Patent
Li et al.

(10) Patent No.: US 11,330,287 B2
(45) Date of Patent: May 10, 2022

(54) METHOD AND APPARATUS FOR VIDEO CODING

(71) Applicant: TENCENT AMERICA LLC, Palo Alto, CA (US)

(72) Inventors: Guichun Li, Milpitas, CA (US); Xiang Li, Saratoga, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 137 days.

(21) Appl. No.: 16/898,059

(22) Filed: Jun. 10, 2020

(65) Prior Publication Data

US 2020/0413082 A1 Dec. 31, 2020

Related U.S. Application Data

(60) Provisional application No. 62/868,488, filed on Jun. 28, 2019.

(51) Int. Cl.
*H04N 19/00* (2014.01)
*H04N 19/513* (2014.01)
(Continued)

(52) U.S. Cl.
CPC ......... *H04N 19/513* (2014.11); *H04N 19/176* (2014.11); *H04N 19/184* (2014.11)

(58) Field of Classification Search
CPC .................................................. H04N 19/00
See application file for complete search history.

(56) References Cited

U.S. PATENT DOCUMENTS

2019/0089960 A1   3/2019  Chen
2021/0385461 A1*  12/2021  Liu ..................... H04N 19/105

FOREIGN PATENT DOCUMENTS

EP          3291557 A1        3/2018
WO    WO-2019010156 A1 *     1/2019  .......... H04N 19/103
WO       2019/160860 A1      8/2019

OTHER PUBLICATIONS

Benjamin Bross et al., Versatile Video Coding (Draft 4), Document: JVET-M1001-v7, Jan. 9-18, 2019, 299 pages.
(Continued)

*Primary Examiner* — Maryam A Nasri
(74) *Attorney, Agent, or Firm* — ArentFox Schiff LLP

(57) ABSTRACT

Aspects of the disclosure provide methods and an apparatus that includes processing circuitry that decodes coding information of a current block (CB) from a coded video bitstream. The processing circuitry generates initial predictions for samples in a subblock in the CB based on an inter prediction mode indicated by the coding information. For one of the samples, the processing circuitry determines a motion vector (MV) refinement (MVR). An absolute value of an x component or a y component of the MVR is one of: (i) $2^{N1}$ and (ii) a sum or a difference of $2^{N1}$ and $2^{M1}$. N1 and M1 are integers. The processing circuitry generates a prediction refinement based on the MVR and spatial gradients for the one of the samples, and generates a refined prediction based on the initial prediction of the one of the samples and the prediction refinement.

18 Claims, 21 Drawing Sheets

(51) Int. Cl.
   *H04N 19/184*   (2014.01)
   *H04N 19/176*   (2014.01)

(56) References Cited

OTHER PUBLICATIONS

Jiancong (Daniel) Luo et al., CE2-related: Prediction refinement with optical flow for affine mode, Document: JVET-N0236-r5, Mar. 19-27, 2019, 8 pages.

Guichun Li et al., Non-CE4: Adaptive subblock size for affine motion compensation, Document: JVET-O0xxx, Jul. 3-12, 2019, 5 pages.

Series H: Audiovisual and Multimedia Systems Infrastructure of audiovisual services—Coding of moving video; ITU-T, H.265, Dec. 2016, 664 pages.

Partial supplementary European Search Report dated Dec. 14, 2021 in European Application No. 20819178.3, 20 pages.

Luong Pham Van et al., CE4-related: Affine restrictions for the worst-case bandwidth reduction, Document: JVET-L0396-V5, Joint Video Experts Team (JVET) of ITU-T SG 16 WP 3 and ISO/IEC JTC 1/SC 29/WG 11, 12$^{th}$ Meeting: Macao, CN, Oct. 3-12, 2018, 4 pages.

Han HUANG et al., CE2: Worst-case Memory Bandwidth Reduction for affine (Test 2-4.5), Document: JVET-N0256, Joint Video Experts Team (JVET) of ITU-T SG 16 WP 3 and ISO/IEC JTC 1/SC 29/WG 11, 14$^{th}$ Meeting: Geneva, CH, Mar. 19-27, 2019, 6 pages.

Haitao YANG et al., Description of CE4: Inter prediction and motion vector coding. Document. JVET-J1024, Joint Video Experts Team (JVET) of ITU-T SG 16 WP 3 and ISO/IEC JTC 1/SC 29/WG 11, 10$^{th}$ Meeting: San Diego, US, Apr. 10-20, 2018, 44 pages.

Jiancong Luo et al., CE2-related: Prediction refinement with optical flow for affine mode, Document. JVET-N0236, Creating the Living Network, InterDigital Inc., Mar. 2019, 13 pages.

\* cited by examiner

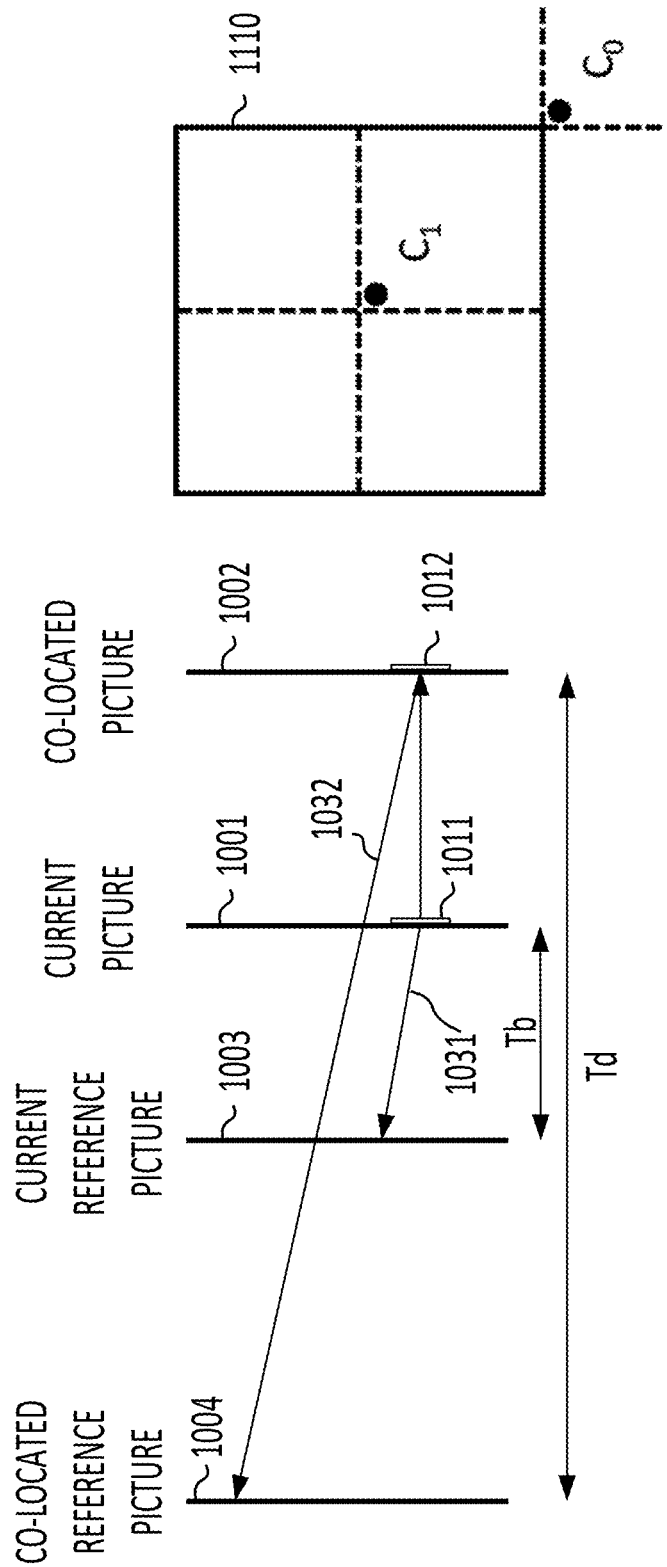

METHOD AND APPARATUS FOR VIDEO CODING

INCORPORATION BY REFERENCE

This present disclosure claims the benefit of priority to U.S. Provisional Application No. 62/868,488, "Inter Prediction Refinement Calculation and Conditional Affine Model Compensation" filed on Jun. 28, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can be configured to decode coding information of a current block (CB) from a coded video bitstream. The coding information can indicate an inter prediction mode for the CB. The processing circuitry can generate initial predictions for samples in a subblock of a plurality of subblocks in the CB based on the inter prediction mode. For one of the samples in the subblock, the processing circuitry can determine a motion vector (MV) refinement (MVR). An absolute value of a first component of the MVR can be one of: (i) $2^{N1}$ and (ii) a sum or a difference of $2^{N1}$ and $2^{M1}$. N1 and M1 are integers. The first component of the MVR can be in a first direction that is one of an x direction and a y direction. The processing circuitry can generate a prediction refinement based on the MVR and spatial gradients for the one of the samples, the spatial gradients being based on the initial predictions for the samples. The processing circuitry can generate a refined prediction based on the initial prediction of the one of the samples and the prediction refinement.

In an embodiment, the spatial gradients include a first spatial gradient in the first direction and a second spatial gradient in a second direction that is another one of the x direction and the y direction. The MVR includes a second component that is in the second direction. An absolute value of the second component of the MVR can be one of: (i) $2^{N2}$ and (ii) a sum or a difference of $2^{N2}$ and $2^{M2}$, N2 and M2 being integers. The processing circuitry can determine a first refinement based on one of: (i) shifting the first spatial gradient by |N1| bits and (ii) separately shifting the first spatial gradient by |N1| and |M1| bits respectively and combining the shifted first spatial gradients. The processing circuitry can determine a second refinement based on one of: (i) shifting the second spatial gradient by |N2| bits and (ii) separately shifting the second spatial gradient by |N2| and |M2| bits respectively and combining the shifted second spatial gradients. The processing circuitry can generate the prediction refinement based on the first refinement and the second refinement.

In an embodiment, the processing circuitry can determine an initial MVR for the one of the samples in the subblock based on the inter prediction mode and round a first component of the initial MVR to generate the first component of the MVR.

In an embodiment, the inter prediction mode is a sub-block-based affine motion model with a prediction refinement with optical flow (PROF). For the one of the samples in the subblock, the processing circuitry can determine a sample MV of the one of the samples and a subblock MV of the subblock based on the subblock-based affine motion model. Further, the processing circuitry can determine the initial MVR based the sample MV and the subblock MV.

In an embodiment, the first component of the MVR is $2^{N1}$ or $-2^{N1}$. In an embodiment, the first component of the MVR is $(2^{N1}+2^{M1})$ or $-(2^{N1}+2^{M1})$.

In an embodiment, the processing circuitry can round the first component of the initial MVR based on a position p of a most significant bit (MSB) of the first component of the initial MVR. In an example, the processing circuitry can left-shift a bit value of 1 by p bits to obtain the absolute value of the first component of the MVR as $2^p$, N1 being equal to p. In an example, the processing circuitry can left-shift a bit value of 1 by p or (p+1) bits to round an absolute value of the first component of the initial MVR to a nearest power of 2 that is one of: $2^p$ and $2^{p+1}$.

In an embodiment, the first component of the initial MVR is a ratio of a first value over a second value, the first value and the second value being non-zero integers. The processing circuitry can round the first component of the initial MVR based on a first position p1 of a MSB of the first value and a second position p2 of a MSB of the second value.

In some examples, an apparatus for video decoding includes processing circuitry. The processing circuitry can be configured to decode coding information of a CB from a coded video bitstream. The coding information can indicate a weighted prediction for the CB. The processing circuitry can determine whether to use a PROF on the CB based on a type of the weighted prediction. In response to the type of the weighted prediction being one of at least one type for disallowing the PROF, the processing circuitry can reconstruct the CB based on the weighted prediction without the PROF. In an example, the at least one type for disallowing the PROF includes a weighted bi-prediction.

Aspects of the disclosure also provide a non-transitory computer-readable medium storing instructions which when executed by a computer for video decoding cause the computer to perform any of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 10 shows an example for temporal candidate derivation in accordance with an embodiment of the disclosure.

FIG. 11 shows an example of candidate positions for a temporal merge candidate in accordance with an embodiment of the disclosure.

DETAILED DESCRIPTION OF EMBODIMENTS

Figure 1:
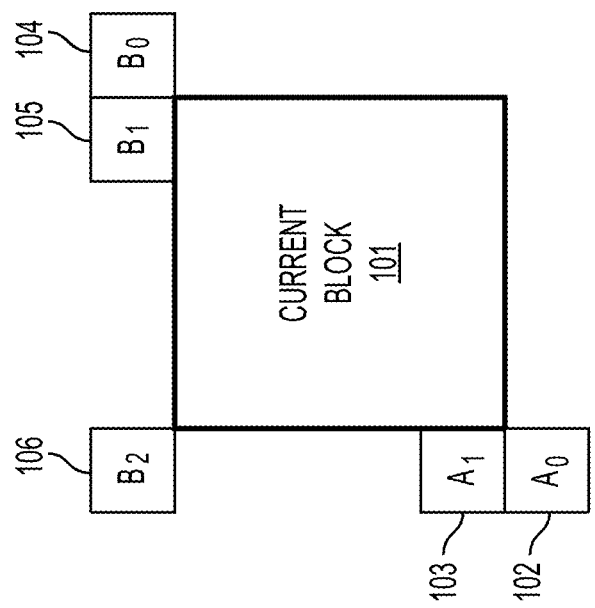
FIG. 1 is a schematic illustration of a current block and its surrounding spatial merge candidates in one example.
Figure 2:
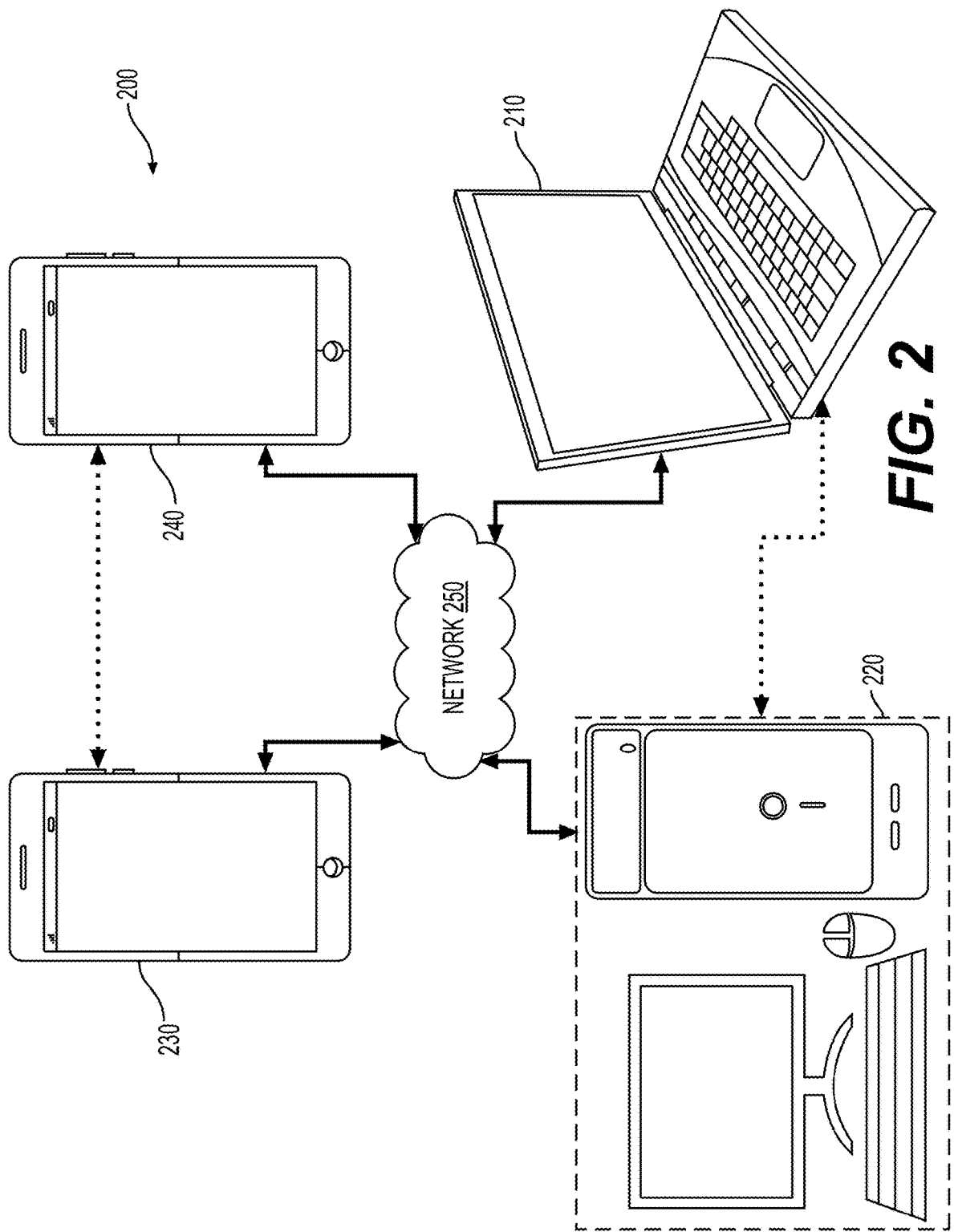
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
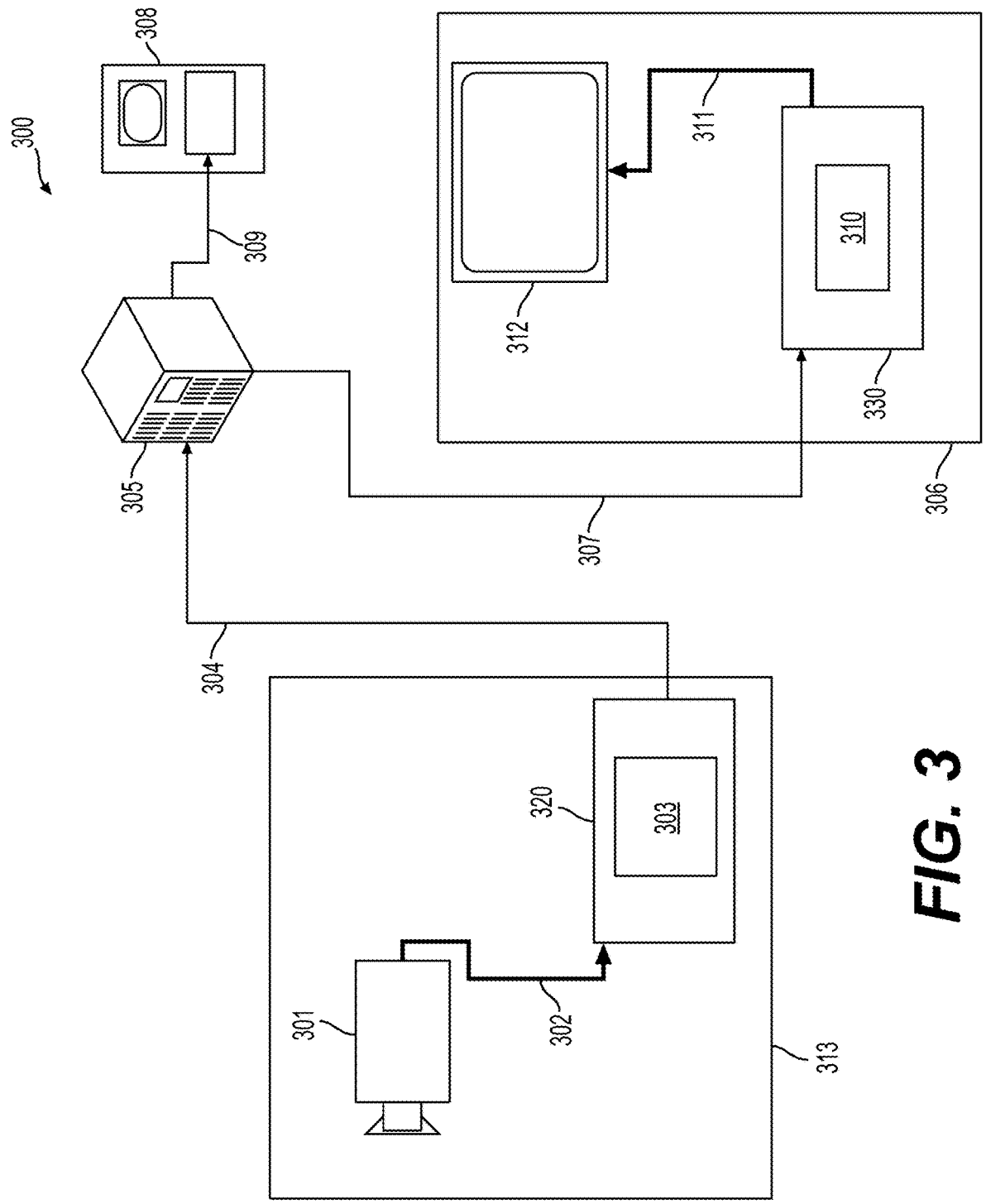
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
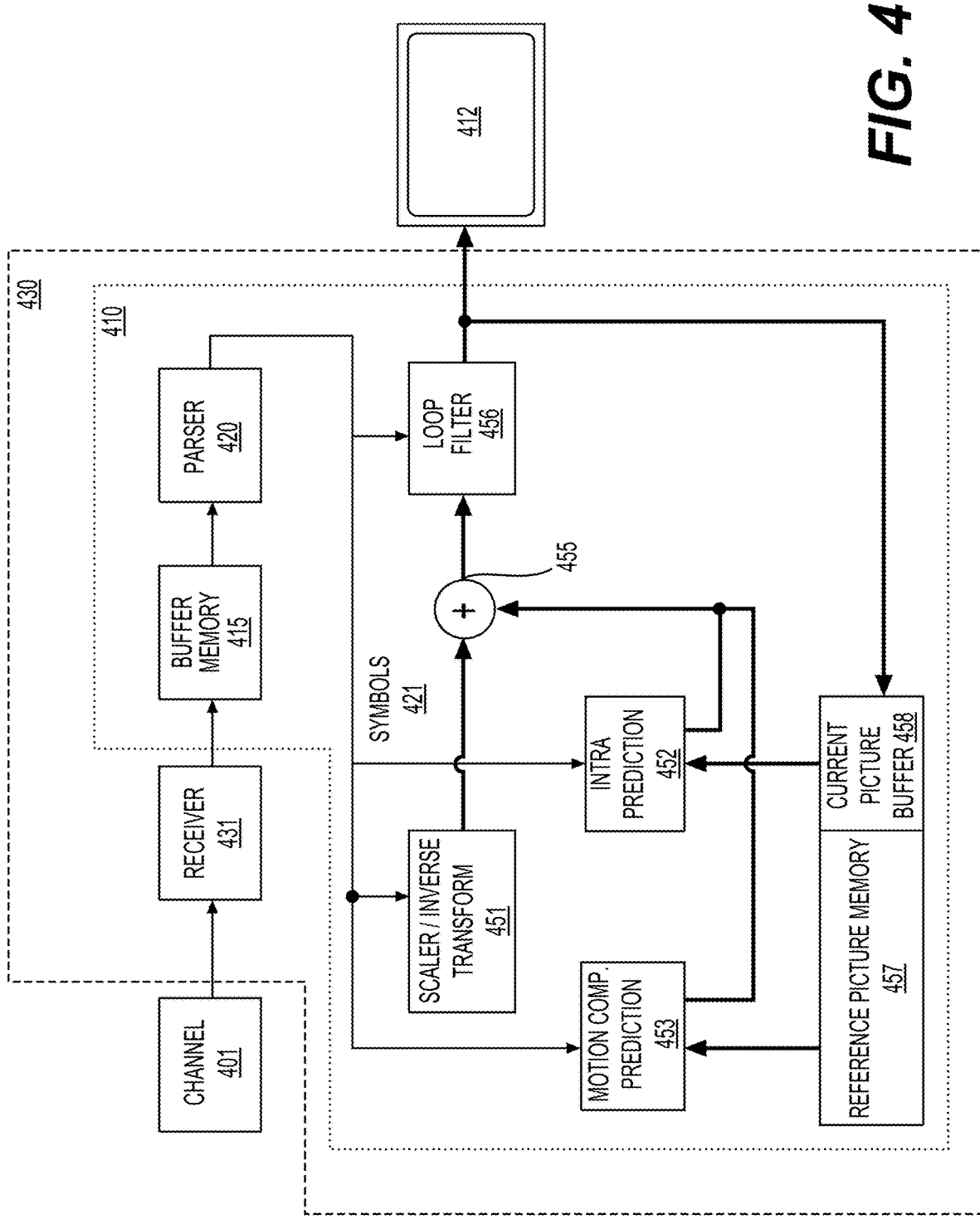
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
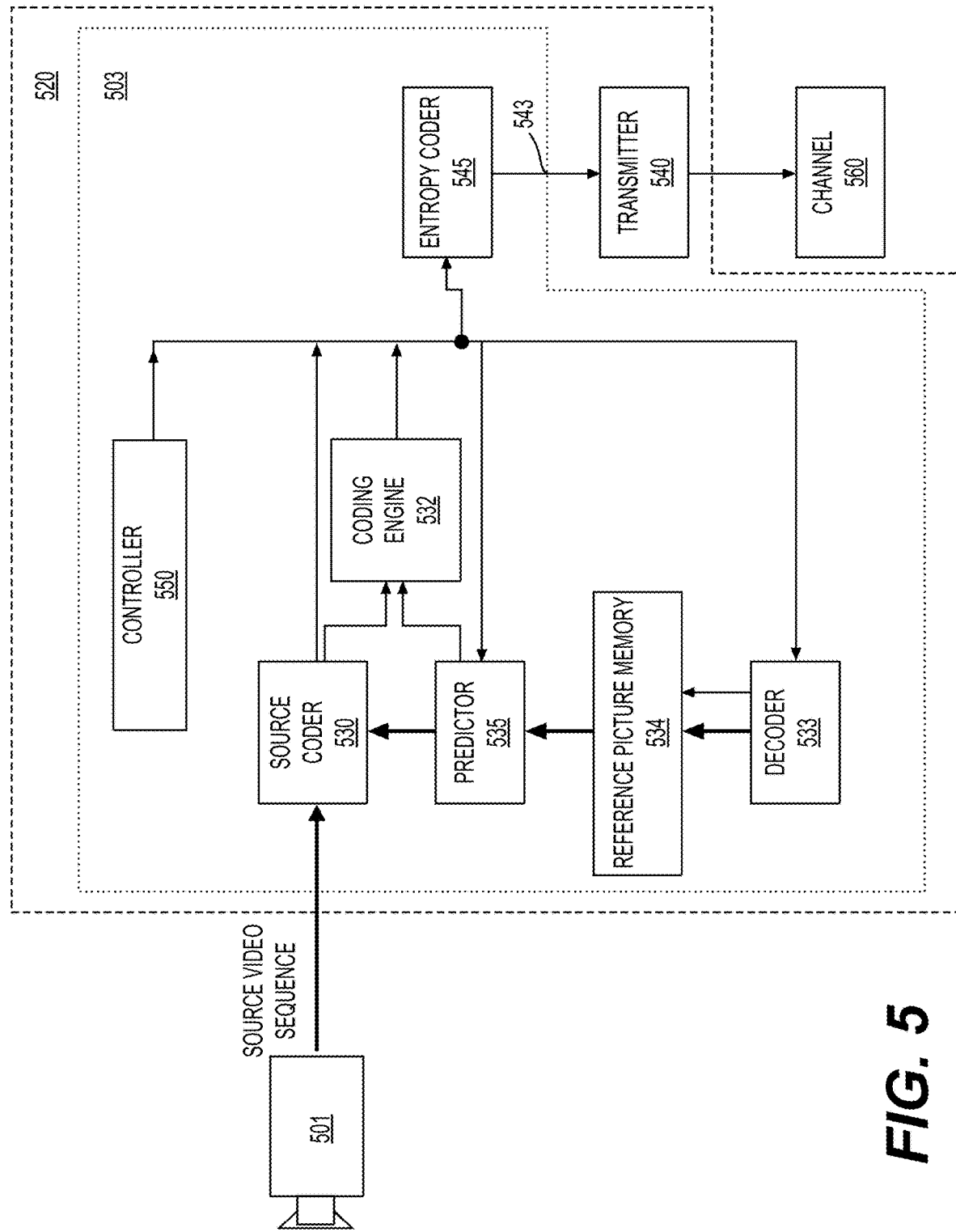
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
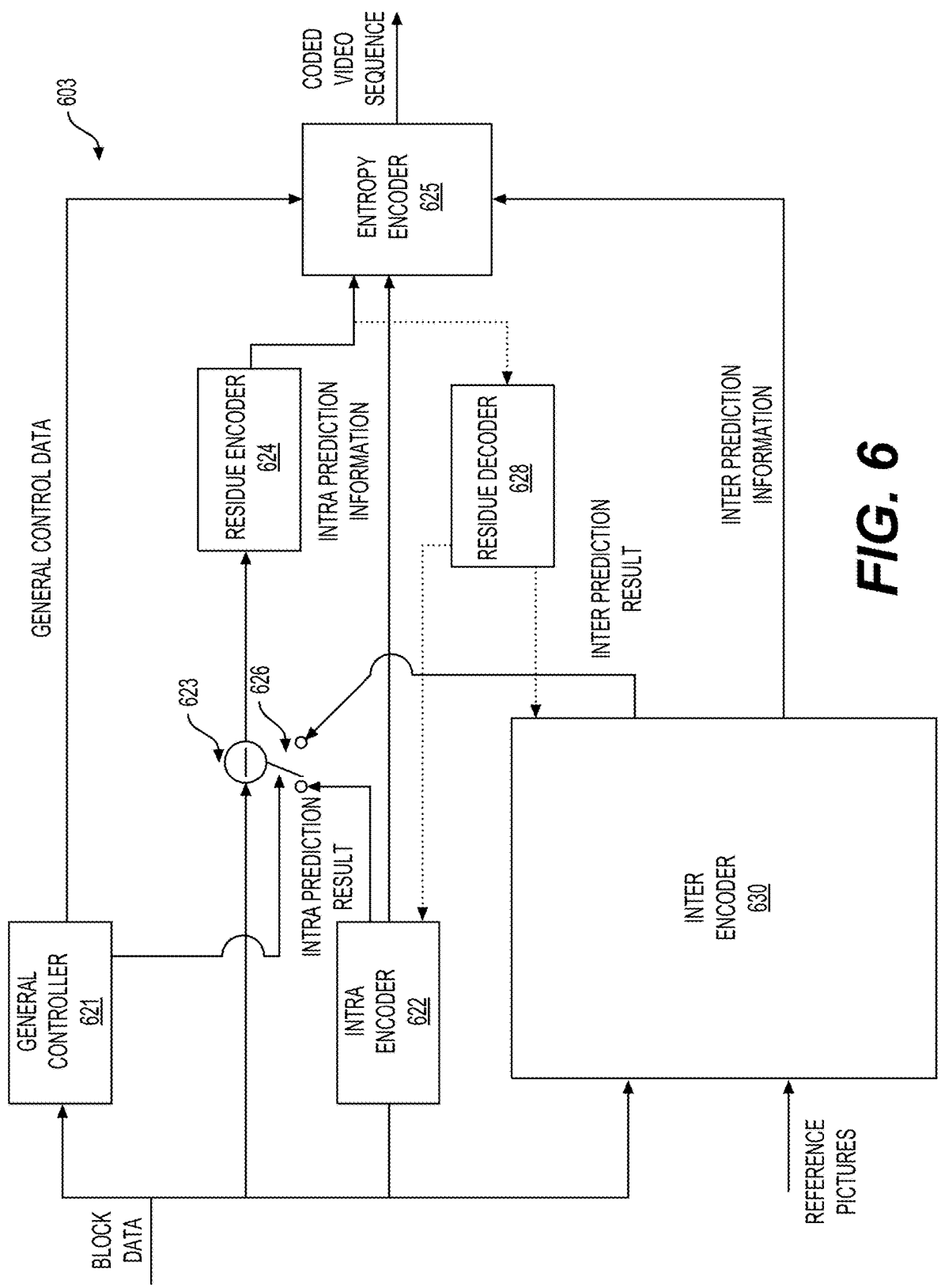
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
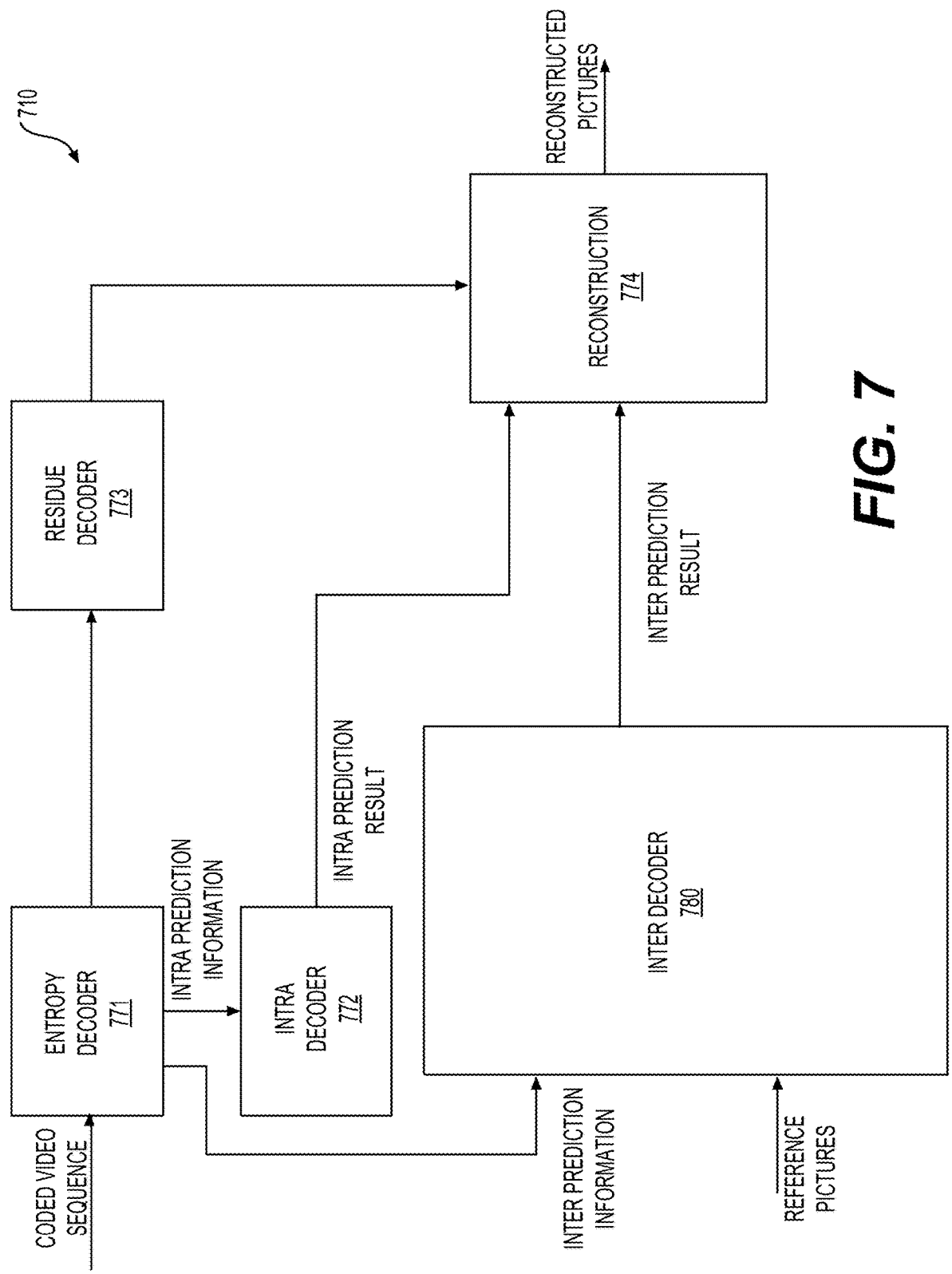
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure are related to inter-prediction, for example, inter-prediction refinement and subblock motion compensation (e.g., affine motion compensation).

In various embodiments, for an inter-predicted CU, motion parameters including motion vectors, reference picture indices, reference picture list usage index, and/or other additional information can be used for inter-predicted sample generation. Inter prediction can include uni-prediction, bi-prediction, and/or the like. In uni-prediction, a reference picture list (e.g., a first reference picture list or a list 0 (L0) or a second reference picture list or a list 1 (L1)) can be used. In bi-prediction, both L0 and L1 can be used. The reference picture list usage index can indicate that the reference picture list(s) includes L0, L1, or L0 and L1.

The motion parameters can be signaled in an explicit or implicit manner. When a CU is coded with a skip mode, the CU can be associated with one PU and can include no significant residual coefficients (e.g., the residual coefficients are zero), no coded motion vector difference (MVD), or no reference picture index.

A merge mode can be used in which motion parameters for a current CU can be obtained from neighboring CUs, including spatial and temporal merge candidates, and optionally other merge candidates. The merge mode can be applied to an inter-predicted CU, and may be used for a skip mode. Alternatively, motion parameters can be explicit transmitted or signaled. For example, motion vectors, a corresponding reference picture index for each reference picture list, a reference picture list usage flag, and other information can be signaled explicitly per each CU.

In some embodiments, one or more of the following inter prediction coding tools are used: (1) extended merge prediction, (2) merge mode with motion vector difference (MMVD), (3) advanced motion vector prediction (AMVP) mode with symmetric MVD signaling, (4) affine motion compensated prediction, (5) subblock-based temporal motion vector prediction (SbTMVP), (6) adaptive motion vector resolution (AMVR), (7) motion field storage: 1/16th luma sample MV storage and 8×8 motion field compression, (8) bi-prediction with weighted averaging (BWA), (9) bi-directional optical flow (BDOF), (10) decoder side motion vector refinement (DMVR), (11) triangle partition prediction, and (12) combined inter and intra prediction (CIIP).

In some examples, extended merge prediction is used, such as in VTM4. The merge candidate list can be constructed by including five types of candidates in an order of: (1) spatial motion vector predictor (MVP) from spatial neighboring CUs; (2) temporal MVP from collocated CUs; (3) history-based MVP from a first in first out (FIFO) table; (4) pairwise average MVP; and (5) zero MVs. In some embodiments, the techniques used in merge candidate list construction include spatial candidate derivation, temporal candidate derivation, history-based merge candidate derivation, and pair-wise average merge candidate derivation.

In an example, a size of the merge candidate list is signaled in a slice header, and the maximum allowed size of the merge candidate list is 6 in VTM4. For each CU coded in the merge mode, an index of the best merge candidate can be encoded using truncated unary binarization (TU). A first binary of the merge index can be coded with context coding, and bypass coding can be used for other binaries.

Figure 9:
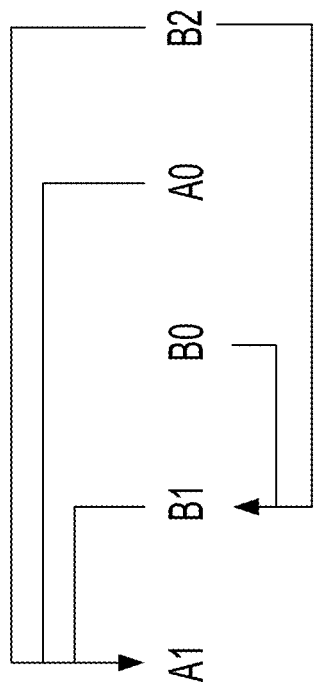
FIG. 9 shows a diagram illustrating candidate pairs for a redundancy check of spatial merge candidates in accordance with an embodiment of the disclosure.

For spatial candidate derivation, according to an aspect of the disclosure, the derivation of spatial merge candidates in VVC is similar to that in HEVC. For example, a maximum of four merge candidates are selected among candidates located in the positions A0-A1 and B0-B2 depicted for a CU (810) in FIG. 8. An order of derivation can be B0, A0, B1, A1 and B2. Other suitable orders can also be used. In an example, the position B2 is considered only when each CU of position A0, B0, B1, A1 is not available (e.g. belonging to another slice or tile) or is intra coded. After a candidate at the position A1 is added, the addition of the remaining candidates can be subject to a redundancy check which ensures that candidates with the same motion information are excluded from the list (e.g., the merge candidate list) so that coding efficiency is improved. In an example, to reduce computational complexity, not all possible candidate pairs are considered in the redundancy check described above. FIG. 9 shows a diagram illustrating candidate pairs for a redundancy check of spatial merge candidates in some embodiments. In an embodiment, only pairs linked with an arrow in FIG. 9 are considered in a redundancy check and a candidate is only added to the list if a corresponding candidate used for the redundancy check does not have the same motion information. Examples of pairs shown in FIG. 9 include (A1, B1), (A1, A0), (A1, B2), (B1, B0), and (B1, B2).

For temporal candidate derivation, according to an aspect of the disclosure, only one candidate is added to the list. In an example, in the derivation of the temporal merge candidate, a scaled motion vector is derived based on a co-located CU belonging to the collocated reference picture. The reference picture list to be used for derivation of the co-located CU can be explicitly signaled in the slice header.

FIG. 10 shows an example for temporal candidate derivation. FIG. 10 shows a sequence of pictures that includes a current picture (1001) having a current CU (e.g., curr-CU) (1011), a collocated picture or co-located picture (1002) having a collocated CU (e.g., col_CU) (1012) of the current CU (1011), a current reference picture (e.g., curr_ref) (1003) of the current picture (1001) and a collocated reference picture or co-located reference picture (1004) of the collocated picture (1002). In an example, a picture order count (POC) distance (e.g., difference of POCs) between the current reference picture (1003) and the current picture (1001) is denoted as the POC distance Tb, and a POC distance between the collocated reference picture (1004) and the co-located picture (1002) is denoted as the POC distance Td. A scaled MV (1031) for a temporal merge candidate can be scaled from a MV (1032) of the co-located CU (1012) based on the POC distances Tb and Td (e.g., a ratio of Tb over Td). A reference picture index of the temporal merge candidate can be set to zero.

FIG. 11 shows an example of candidate positions for the temporal merge candidate for a CU (1110). The position for the temporal merge candidate can be selected between candidates C0 and C1. When a CU at the position C0 is not available, or is intra coded, or is outside of a current row of CTUs, then the position C1 can be used. Otherwise, the position C0 can be used in the derivation of the temporal merge candidate.

In some examples, a translation motion model is applied for motion compensation prediction (MCP). A block-based affine motion compensation (also referred to as affine motion compensated prediction, affine motion compensation method, affine motion prediction, affine motion model, affine transform motion compensation prediction) can be applied, for example, to model various types of motions, such as zoom in/out, rotation, perspective motions, and other irregular motions (e.g., motions that are different from the translation motion).

Figure 12B:
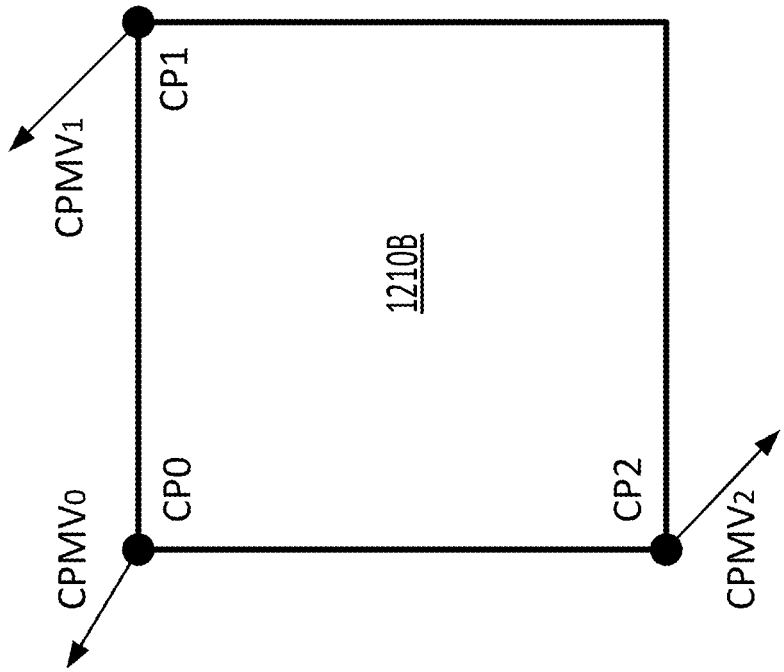
FIG. 12B shows an example of a 6-parameter affine motion model in accordance with an embodiment of the disclosure.
Figure 12A:
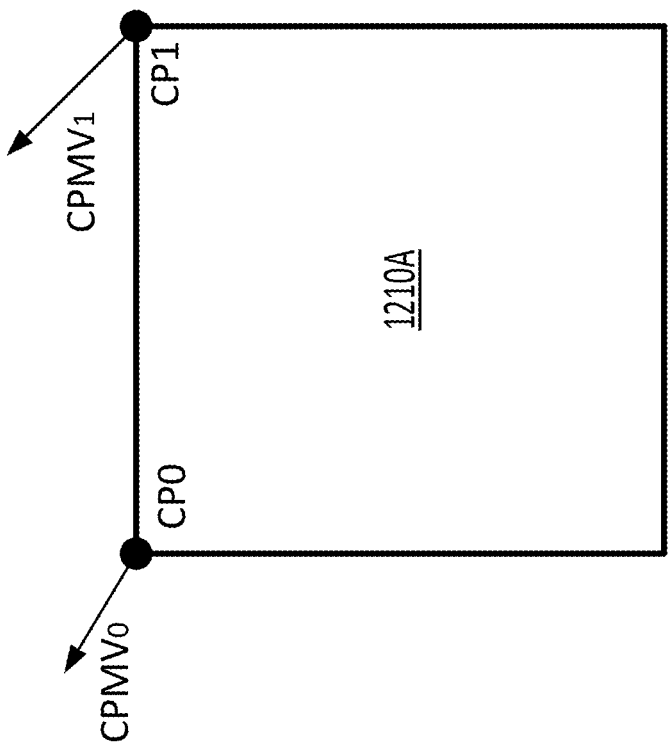
FIG. 12A shows an example of a 4-parameter affine motion model in accordance with an embodiment of the disclosure.

In FIG. 12A, an affine motion field of a block (1210A) is described by motion information of two control points (CPs), CP0 and CP1, when a 4-parameter affine model (or a 4-parameter affine motion model) is used. The motion information can include two MVs or control point MVs (CPMVs), CPMV0 and CPMV1, of CP0 and CP1, respectively. In FIG. 12B, an affine motion field of a block (1210B) is described by motion information of three CPs, CP0-CP2, when a 6-parameter affine model (or a 6-parameter affine motion model) is used. The motion information can include three MVs or CPMVs, CPMV0-CPMV2, of CP0-CP2, respectively.

For the 4-parameter affine motion model, a motion vector at a sample location (x, y) in the block (1210A) can be derived as:

$$\begin{cases} mv_x = \dfrac{mv_{1x} - mv_{0x}}{W}x - \dfrac{mv_{1y} - mv_{0y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad \text{(Eq. 1)}$$

where $(mv_{0x}, mv_{0y})$ is a MV (CPMV0) of a top-left CP (CP0) and $(mv_{1x}, mv_{1y})$ is a MV (CPMV1) of a top-right CP (CP1). The coordinate (x, y) can be with respect to a top-left sample of the block (1210A) and W denotes a width of the block (1210A).

For the 6-parameter affine motion model, a motion vector at a sample location (x, y) in the block (1210B) can be derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{(Eq. 2)}$$

where $(mv_{0x}, mv_{0y})$ is a MV (CPMV0) of a top-left corner CP (CP0), $(mv_{1x}, mv_{1y})$ is a MV (CPMV1) of a top-right corner CP (CP1), and $(mv_{2x}, mv_{2y})$ is a MV (CPMV2) of a bottom-left corner CP (CP2). The coordinate (x, y) is with respect to a top-left sample of the block (1210B), W denotes a width of the block (1210B), and H denotes a height of the block (1210B).

Figure 13:
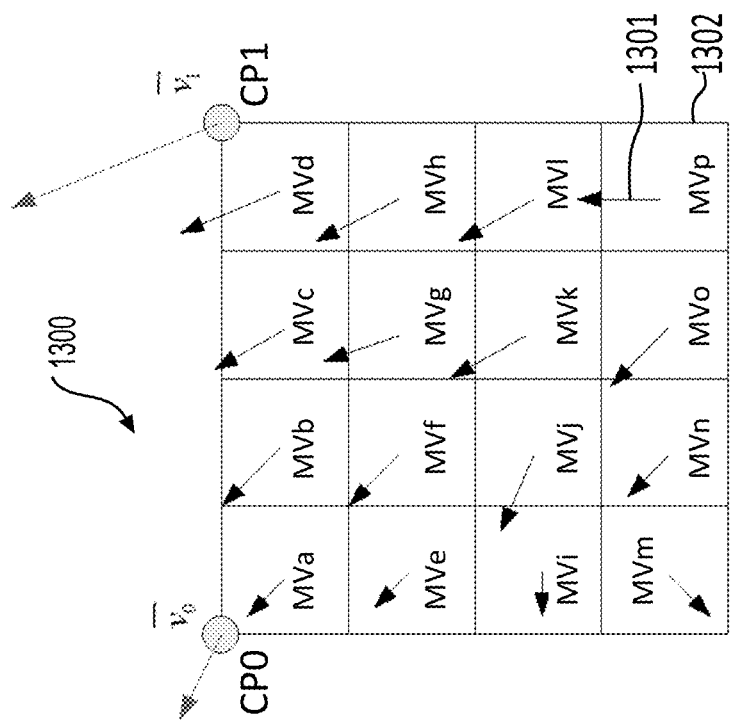
FIG. 13 shows an example of a subblock-based affine motion model in accordance with an embodiment of the disclosure.

In order to simplify the motion compensation prediction, a subblock-based affine motion compensation (also referred to as a subblock-based affine motion model) is applied in some embodiments, as shown in FIG. 13. In the subblock-based affine motion compensation, a current block (e.g., a luma block) (1300) can be partitioned into a plurality of subblocks (also referred to as affine subblocks) (1302). MVs of respective samples in each of the plurality of subblocks (1302) can be represented using a MV (also referred to as a subblock MV) (1301). In an example, a subblock MV (1301) of the subblock (1302) is a MV of a center sample of the subblock (1302). Thus, the subblock MV (1301) can be calculated using the 4-parameter affine motion model (e.g., Eq. 1), the 6-parameter affine motion model (e.g., Eq. 2), or the like. Referring to FIG. 13, the current block (1300) is partitioned to 16 subblocks (1302) having 16 subblock MVs (e.g., MVa-MVp) (1301).

Referring to FIG. 13, the 4-parameter affine motion model is used as an example. $\vec{v}_0$ and $\vec{v}_1$ are CPMVs for a top-left CP (CP0) and a top-right CP (CP1), respectively. To derive the subblock MV (1301) of the subblock (1302), the MV of the center sample of the subblock (1302) can be calculated according to Eq. (1), and rounded to a 1/16 fraction accuracy (e.g., a precision for the subblock MV is 1/16 of a sample or a pixel). Motion compensation interpolation filters can be applied to generate a prediction of each subblock (1302) with the derived MV (1301).

A subblock size of chroma-components can be set to be 4×4. A subblock MV of a 4×4 chroma subblock can be calculated as an average of subblock MVs of four corresponding 4×4 luma subblocks.

Similar to translational motion inter prediction, two affine motion inter prediction modes, affine merge mode (or affine merge prediction, an AF_MERGE mode) and affine AMVP mode (or affine AMVP prediction), are employed in some embodiments.

In some embodiments, an affine merge mode (e.g., an AF_MERGE mode) can be applied for CUs with both a width and a height larger than or equal to 8. In the affine merge mode, CPMVs of a current CU can be generated based on motion information of spatial neighboring CUs of the current CU. Up to five CPMV predictor (CPMVP) candidates can be included in a candidate list (e.g., an affine merge candidate list) and an index can be signaled to indicate the candidate to be used for the current CU. The following three types of CPMVP candidates can be used to form an affine merge candidate list: (a) inherited affine merge candidates that are extrapolated from CPMVs of the neighboring CUs (e.g., the spatial neighboring CUs); (b) constructed affine merge candidates that are derived using translational MVs of the neighboring CUs (e.g., the spatial neighboring CUs and/or a temporal neighboring CU); and/or (c) zero MVs.

Figure 8:
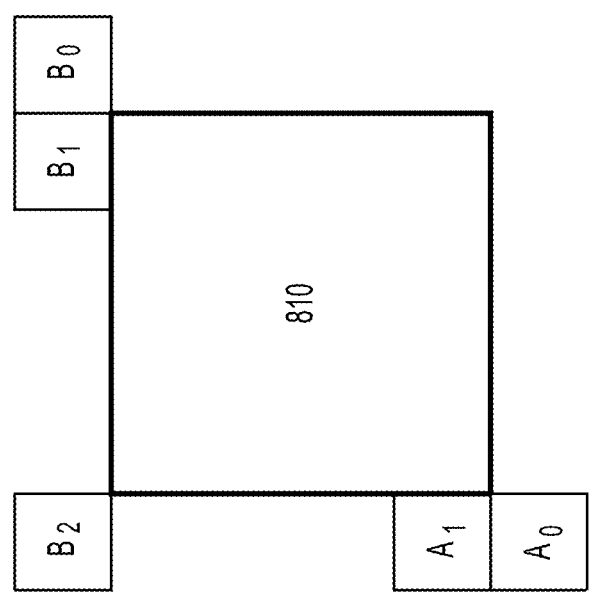
FIG. 8 shows an example of positions of spatial merge candidates for a coding unit in accordance with an embodiment of the disclosure.
Figure 14:
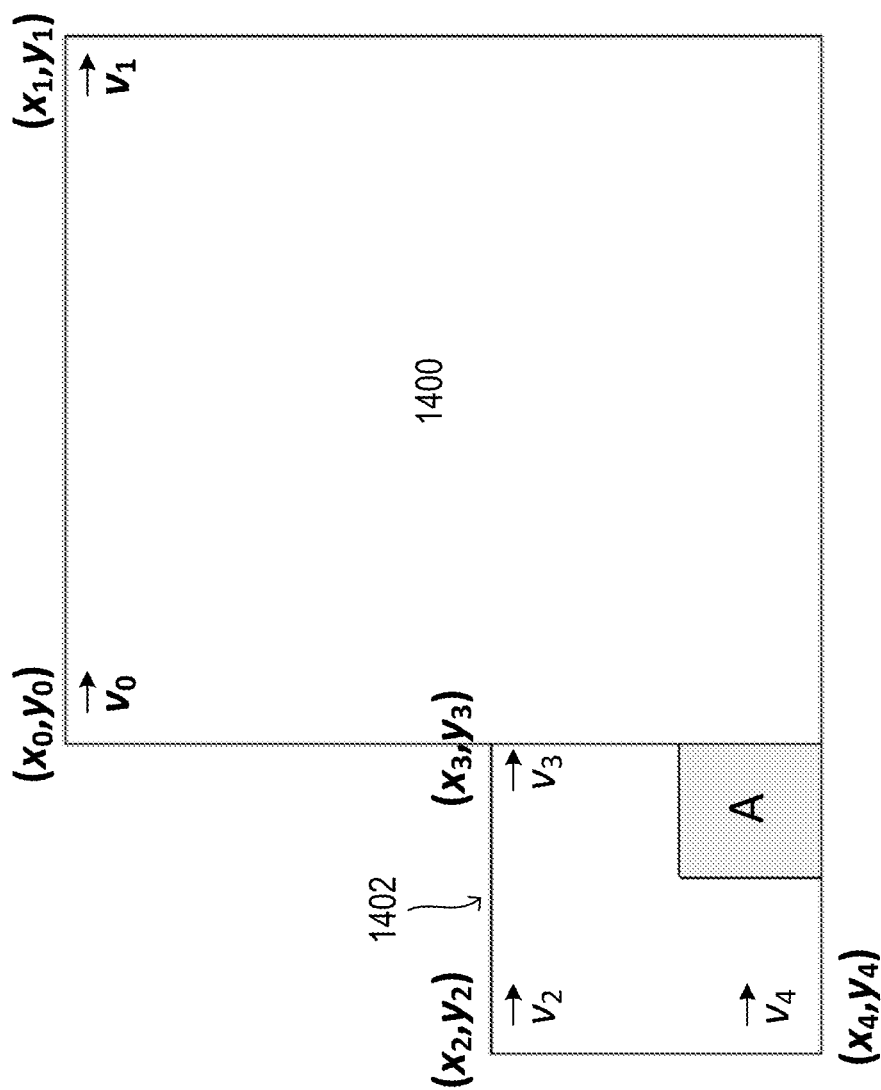
FIG. 14 shows an example of control point motion vector inheritance in accordance with an embodiment of the disclosure.

In an embodiment, such as in VTM3, the candidate list (e.g., the affine merge candidate list) includes up to two inherited affine merge candidates that can be derived from affine motion models of the neighboring CUs (or blocks). For example, a first inherited affine merge candidate can be derived from left neighboring CUs and a second inherited affine merge candidate can be derived from above neighboring CUs. Exemplary candidate CUs (or blocks) for the CU (810) are shown in FIG. 8. In order to obtain the first inherited affine merge candidate (or a left predictor), a scan order of A0→A1 can be applied. In order to obtain the second inherited affine merge candidate (or an above predictor), a scan order can be B0→B1→B2. In an example, only a first inherited candidate from each side (e.g., left side and/or above side) is selected. In addition, no pruning check is performed between two inherited candidates. When a neighboring affine CU is identified, CPMVs of the neighboring affine CU can be used to derive a CPMVP candidate in the affine merge candidate list of the current CU. As shown in FIG. 14, if a neighboring left bottom block A is coded in an affine motion mode, MVs v2, v3, and v4 of a top left corner, a top right corner, and a left bottom corner of a CU (1402) that includes the block A can be obtained. When the block A is coded with the 4-parameter affine motion model, two CPMVs of a current CU (1400) can be calculated according to v2 and v3. When the block A is coded with the 6-parameter affine motion model, three CPMVs of the current CU (1400) can be calculated according to v2, v3, and v4.

A constructed affine merge candidate for a CU can refer to a candidate that is constructed by combining neighboring translational motion information of each CP of the CU. The motion information for the CPs can be derived from spatial neighbors and a temporal neighbor of a current block (1500) shown in FIG. 15. $CPMV_k$ (k=1, 2, 3, 4) can represent a k-th CP of the current block (1500). For the $CPMV_1$, blocks B2, B3, and A2 can be checked. For example, a scan order is B2→B3→A2 and a MV of the first available block can be used as the $CPMV_1$. For the $CPMV_2$, blocks B1 and B0 can be checked, for example using a scan order of B1→B0. For the $CPMV_3$, blocks A1 and A0 can be checked, for example using a scan order of A1→A0. When a temporal motion vector predictor (TMVP) (indicated by T in FIG. 15) is available, the TMVP can be applied as the $CPMV_4$.

After MVs of four CPs are obtained, affine merge candidates can be constructed based on the motion information of the four control points. The following combinations of CPMVs can be used to construct the affine merge candidates sequentially: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, and {$CPMV_1$, $CPMV_3$}.

A combination of 3 CPMVs can construct a 6-parameter affine merge candidate and a combination of 2 CPMVs can construct a 4-parameter affine merge candidate. To avoid a motion scaling process, if reference indices of control points are different, the corresponding combination of CPMVs can be discarded.

After inherited affine merge candidates and constructed affine merge candidates are checked, if the affine merge candidate list is not full, zero MVs can be inserted to the end of the affine merge candidate list.

In some embodiments, an affine AMVP mode can be applied for CUs with both a width and a height larger than or equal to 16. An affine flag in a CU level can be signaled in a bitstream to indicate whether the affine AMVP mode is used and then another flag can be signaled to indicate whether a 4-parameter affine motion model or a 6-parameter affine motion model is used. In the affine AMVP mode, a difference of CPMVs of a current CU and corresponding CPMV predictors (CPMVP) can be signaled in the bitstream. An affine AMVP candidate list size can be 2, and can be generated by using the following four types of CPMV candidates, for example, in an order of (a)→(b)→(c)→(d): (a) Inherited affine AMVP candidates that are extrapolated from the CPMVs of the neighbor CUs; (b) Constructed affine AMVP candidates that are derived using the translational MVs of the neighbor CUs; (c) Translational MVs from neighboring CUs; and (d) Zero MVs.

The checking order (or scan order) of the inherited affine AMVP candidates is similar or identical to the checking order of the inherited affine merge candidates in an example. In an example, a difference between the inherited affine AMVP candidates and the inherited affine merge candidates is that, for the inherited affine AMVP candidates, only the affine CU that has the same reference picture as in the current block is considered. No pruning process is applied when inserting an inherited affine MV predictor (or inherited affine AMVP candidate) into the affine AMVP candidate list.

Figure 15:
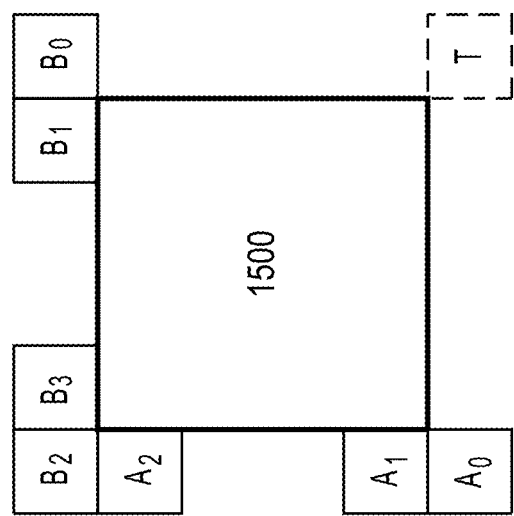
FIG. 15 shows an example of candidate positions for constructing an affine merge candidate in accordance with an embodiment of the disclosure.

A constructed AMVP candidate can be derived from specified spatial neighbors shown in FIG. 15. A same checking order as used in constructing affine merge candidate(s) can be used. In addition, a reference picture index of a neighboring block can also be checked. The first block in the checking order that is inter coded and has the same reference picture as in the current CU can be used. When the current CU is coded with a 4-parameter affine motion model, and CPMV1 and CPMV2 are both available, the available CPMVs (e.g., CPMV1 and CPMV2) can be added as one candidate in the affine AMVP candidate list. When the current CU is coded with a 6-parameter affine motion mode, and all three CPMVs (e.g., CPMV1, CPMV2, and CPMV3) are available, the available CPMVs can be added as one candidate in the affine AMVP candidate list. Otherwise, a constructed AMVP candidate can be set as unavailable.

If the affine AMVP candidate list size is less than 2 after inherited affine AMVP candidate(s) and constructed AMVP candidate(s) are checked, translational MVs from neighboring CU(s) of the current block (1500) can be added to predict all control point MVs of the current block (1500), when available. Finally, zero MVs can be used to fill the affine AMVP candidate list if the affine AMVP candidate list is still not full.

Embodiments of the present disclosure can be applied to affine subblock motion compensation with an interpolation filter (e.g., a 6-tap or 8-tap interpolation filter). In an example, inter prediction on 4×4 luma blocks is disabled except for affine subblock predictions. In an example, for luma blocks with a size of 4×8 or 8×4, only inter uni-prediction is allowed.

In an example, for affine subblock motion compensation for a luma sample size of 4×4, a 6-tap interpolation filter is used, as shown in Table 1. For luma motion compensations that are not based on an affine motion model, an 8-tap interpolation filter can be used, as shown in Table 2.

TABLE 1

The 6-tap interpolation filter

| MV | | Tap filter | | | | |
|---|---|---|---|---|---|---|
| 0 | 0 | 0 | 64 | 0 | 0 | 0 |
| 1/16 | 1 | −3 | 63 | 4 | −2 | 1 |
| 1/8 | 1 | −5 | 62 | 8 | −3 | 1 |
| 3/16 | 2 | −8 | 60 | 13 | −4 | 1 |
| 1/4 | 3 | −10 | 58 | 17 | −5 | 1 |
| 5/16 | 3 | −11 | 52 | 26 | −8 | 2 |
| 3/8 | 2 | −9 | 47 | 31 | −10 | 3 |
| 7/16 | 3 | −11 | 45 | 34 | −10 | 3 |
| 1/2 | 3 | −11 | 40 | 40 | −11 | 3 |
| 9/16 | 3 | −10 | 34 | 45 | −11 | 3 |
| 5/8 | 3 | −10 | 31 | 47 | −9 | 2 |
| 11/16 | 2 | −8 | 26 | 52 | −11 | 3 |
| 6/8 | 1 | −5 | 17 | 58 | −10 | 3 |
| 13/16 | 1 | −4 | 13 | 60 | −8 | 2 |
| 7/8 | 1 | −3 | 8 | 62 | −5 | 1 |
| 15/16 | 1 | −2 | 4 | 63 | −3 | 1 |

TABLE 2

The 8-tap interpolation filter

| MV | | | Tap filter | | | | | |
|---|---|---|---|---|---|---|---|---|
| 0 | 0 | 0 | 0 | 64 | 0 | 0 | 0 | 0 |
| 1/16 | 0 | 1 | −3 | 63 | 4 | −2 | 1 | 0 |
| 1/8 | −1 | 2 | −5 | 62 | 8 | −3 | 1 | 0 |
| 3/16 | −1 | 3 | −8 | 60 | 13 | −4 | 1 | 0 |
| 1/4 | −1 | 4 | −10 | 58 | 17 | −5 | 1 | 0 |
| 5/16 | −1 | 4 | −11 | 52 | 26 | −8 | 3 | −1 |
| 3/8 | −1 | 3 | −9 | 47 | 31 | −10 | 4 | −1 |
| 7/16 | −1 | 4 | −11 | 45 | 34 | −10 | 4 | −1 |
| 1/2 | −1 | 4 | −11 | 40 | 40 | −11 | 4 | −1 |
| 9/16 | −1 | 4 | −10 | 34 | 45 | −11 | 4 | −1 |
| 5/8 | −1 | 4 | −10 | 31 | 47 | −9 | 3 | −1 |
| 11/16 | −1 | 3 | −8 | 26 | 52 | −11 | 4 | −1 |
| 6/8 | 0 | 1 | −5 | 17 | 58 | −10 | 4 | −1 |
| 13/16 | 0 | 1 | −4 | 13 | 60 | −8 | 3 | −1 |
| 7/8 | 0 | 1 | −3 | 8 | 62 | −5 | 2 | −1 |
| 15/16 | 0 | 1 | −2 | 4 | 63 | −3 | 1 | 0 |

In some embodiments, an affine subblock size and/or an affine subblock interpolation filter used in the subblock-based affine motion model for a CU can be conditionally selected based on a comparison between one or more of affine parameters (or affine related parameters) and a threshold (e.g., a pre-defined threshold) or a value range. In an embodiment, if the affine parameters lead to relatively large MV differences (e.g., when compared with the threshold) among neighboring subblocks in the CU, a smaller size (e.g., 4×4 samples) can be used for a subblock size. Otherwise, a larger size (e.g., 8×8 samples) can be used for the subblock size. In an example, when using a small subblock size, a 6-tap interpolation filter may be used to reduce complexity and a memory bandwidth. Otherwise, an 8-tap interpolation filter can be used.

In an embodiment, the affine parameters can be determined based on CPMVs of the CU, such as $CPMV_0$-$CPMV_1$ shown in FIG. 12A and $CPMV_0$-$CPMV_2$ shown in FIG. 12B. Referring to FIGS. 12A-12B, let x and y be a horizontal coordinate (e.g., in an x direction) and a vertical coordinate (e.g., in a y direction) of a center (or a subblock center) of a subblock, a subblock MV mv(x, y) of the subblock can be derived using Eqs. 3-6 as below.

$$\begin{cases} mv_x(x, y) = a*x + b*y + e \\ mv_y(x, y) = c*x + d*y + f \end{cases} \quad \text{(Eq. 3)}$$

where $mv_x(x,y)$ is a horizontal component (e.g., an x component) of mv(x,y) and $mv_y(x,y)$ is a vertical component (e.g., a y component) of mv(x,y).

Translational motion related parameters 'e' and 'f' (or translational motion parameters, translational parameters) can be derived using Eq. 4.

$$\begin{cases} e = mv_{0x} \\ f = mv_{0y} \end{cases} \quad \text{(Eq. 4)}$$

where $(mv_{0x}, mv_{0y})$ is $CPMV_0$.

In an example, for the 4-parameter affine motion model, such as shown in FIG. 12A, $$\begin{cases} a = d = \dfrac{mv_{1x} - mv_{0x}}{w} \\ c = -b = \dfrac{mv_{1y} - mv_{0y}}{w} \end{cases} \quad \text{(Eq. 5)}$$

for the 6-parameter affine motion model, such as shown in FIG. 12B, $$\begin{cases} a = \dfrac{mv_{1x} - mv_{0x}}{w} \\ b = \dfrac{mv_{2x} - mv_{0x}}{h} \\ c = \dfrac{mv_{1y} - mv_{0y}}{w} \\ d = \dfrac{mv_{2y} - mv_{0y}}{h} \end{cases} \quad \text{(Eq. 6)}$$

where $(mv_{0x}, mv_{0y})$, $(mv_{1x}, mv_{1y})$, and $(mv_{2x}, mv_{2y})$ can be top left (e.g., $CPMV_0$), top right (e.g., $CPMV_1$), and bottom left (e.g., $CPMV_2$) CPMVs, respectively, and w and h are a width and a height of the CU (e.g., the block (1210)).

An affine subblock size (e.g., 4×4 or 8×8) used in the subblock-based affine motion model can be conditionally determined by one or more of the affine parameters. Similarly, a type (e.g., a length or a number of taps) of an interpolation filter (e.g., 6-tap or 8-tap interpolation filter) for the subblock-based affine motion model (also referred to as affine subblock motion compensation) can be conditionally determined by one or more of the affine parameters.

In an embodiment, a subblock-based temporal motion vector prediction (SbTMVP) method can be used in video coding. Similar to a temporal motion vector prediction (TMVP) (e.g., used in HEVC), the SbTMVP can use a motion field in a collocated picture to improve MVP and merge mode for CUs in a current picture. A collocated picture used in the TMVP can be used for the SbTMVP.

The SbTMVP can differ from the TMVP in the following aspects. (i) TMVP can predict motion information (e.g., a MV) at a CU level (e.g., a CB level, a block level), and the SbTMVP can predict motion information (e.g., a MV) at a sub-CU level (e.g., a sub-CB level, a subblock level). (ii) The TMVP can obtain temporal motion information (e.g., temporal MVs) from a collocated block in the collocated picture (e.g., the collocated block is the bottom-right or center block relative to the current CU). The SbTMVP can apply a motion shift before obtaining the temporal motion information from the collocated picture where the motion shift can be obtained from a MV from one of the spatial neighboring blocks of the current CU.

Figure 16A:
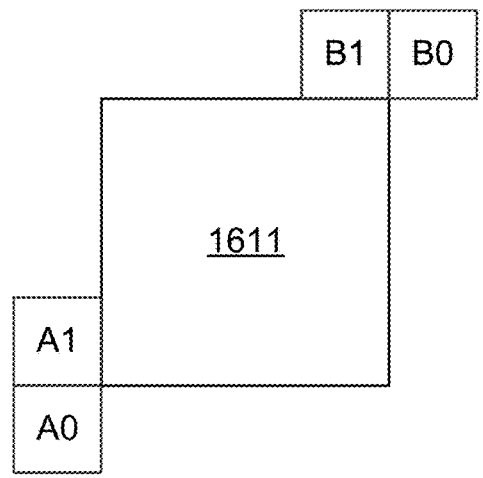
FIGS. 16A-16C show examples of a subblock-based temporal MV prediction (SbTMVP) method in accordance with one embodiment.
Figure 16B:
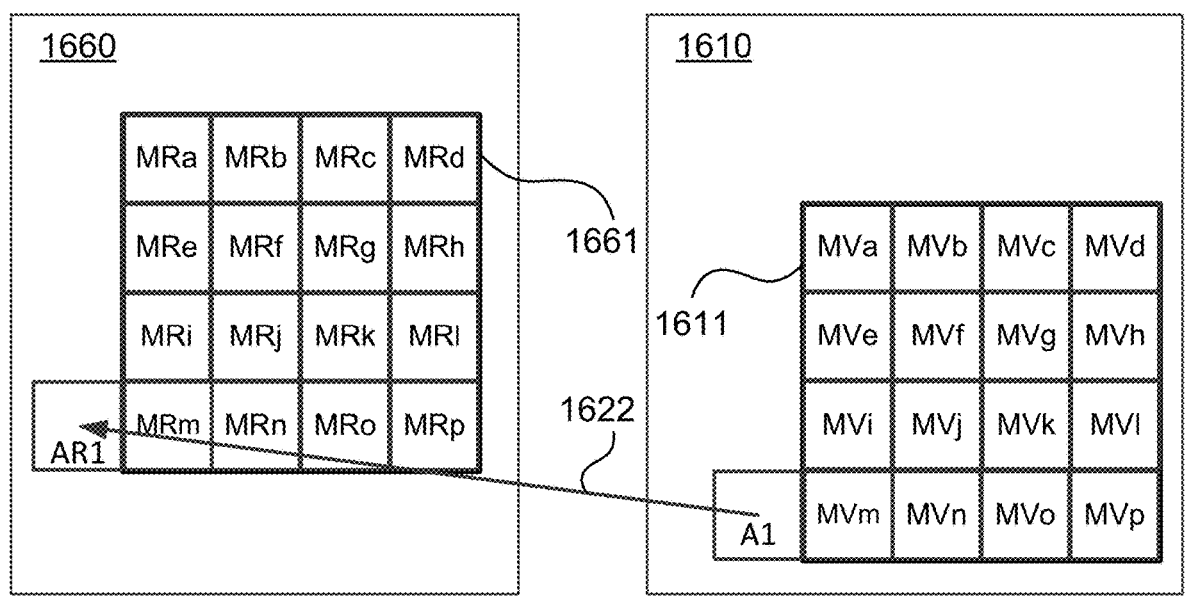
Figure 16C:
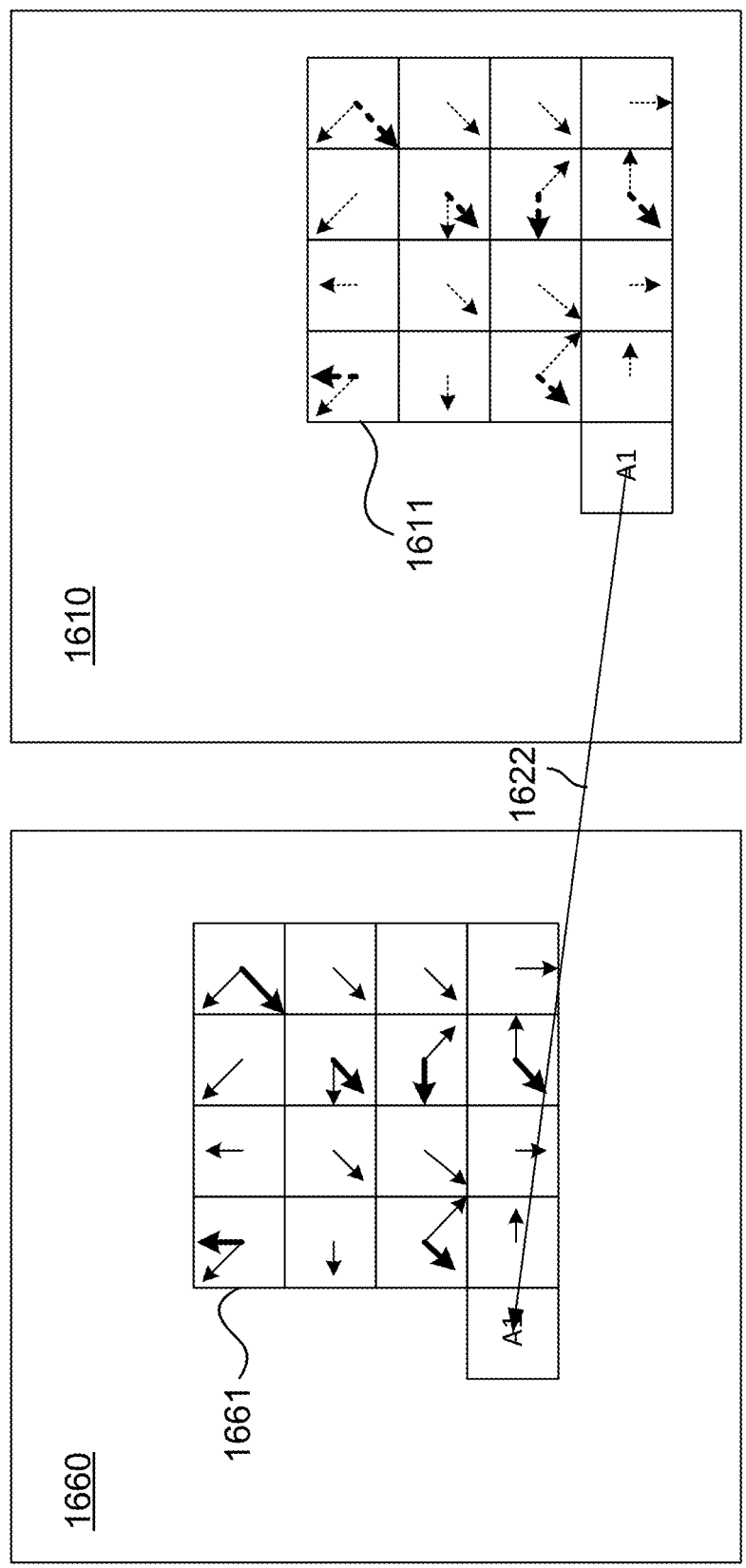

FIGS. 16A-16C show an example of a SbTMVP method in accordance with one embodiment. FIG. 16A shows a current CU (1611) and spatial neighboring blocks A0, A1, B0, and B1 of the current CU (1611). In some examples, spatial neighboring blocks (or spatial neighbors) A0, A1, B0, and B1 and the current CU (1611) are in a current picture (1610). In an example, the current picture (1610) corresponds to a collocated picture (1660).

Referring to FIGS. 16A-16B, the SbTMVP can predict MVs of the sub-CUs in the current CU (1611) in two steps. In a first step, the spatial neighboring blocks A1, B1, B0, and A0 in FIG. 16A can be sequentially checked. As soon as a first spatial neighboring block (e.g., A1) that has a MV (e.g., a MV (1622)) that uses the collocated picture (1660) of the current picture (1610) as a reference picture is identified, the MV (1622) can be used for performing the motion shift. In an example, the MV (1622) points to a reference block AR1 in the reference picture (1660). If no such MV is available from the spatial neighboring blocks A1, B1, B0, and A0, the motion shift can be set to (0, 0).

In a second step, the motion shift (e.g., the MV (1622)) identified in the first step can be applied (e.g., the motion shift can be added to coordinates of the current CU (1611)) to obtain sub-CU level motion information (e.g., MVs and corresponding reference indices) from the collocated picture (1660) as shown in FIG. 16B. Referring to FIG. 16B, the motion shift can be set to be the MV (1622) of A1. Thus, for each sub-CU in the current CU (1611), the motion information (also referred to as reference motion information) of a corresponding block (e.g., a smallest motion grid that covers a center sample) in the collocated picture (1660) can be used to derive the motion information for the sub-CU in the current CU (1611). After the reference motion information (e.g., MRa) of the collocated sub-CU is identified, the reference motion information (e.g., MRa) can be converted to the motion information (e.g., MVa including the motion vectors and reference indices) of the current sub-CU, for example, in a similar way as the TMVP process of HEVC, where a temporal motion scaling can be applied to align the reference pictures of the temporal motion vectors to those of the current CU (1611).

In FIG. 16B, a reference CU (1661) in the collocated picture (1660) can include 16 sub-CUs with reference motion information MRa-MRp. Each of the 16 sub-CUs in the reference CU (1661) can correspond to a smallest motion grid that covers a center sample of the sub-CU. The reference motion information can include motion vectors and corresponding reference indices. The current CU (1611) can include 16 sub-CUs, and the motion information MVa-MVp for the sub-CUs in the current CU (1611) can be derived based on the respective reference motion information MRa-MRp in a manner similar to the TMVP process, with temporal scaling in some examples.

FIG. 16C shows examples of the reference motion information MRa-MRp and the motion information MVa-MVp according to an embodiment of the disclosure. The reference motion information MRa-MRp can include motion information based on L0 and/or L1. The motion information MVa-MVp can include motion information based on L0 and/or L1. In the co-located picture (1660), the reference motion information (e.g., MRa, MRd, MRg, MRi, MRk, and MRo) can be based on L1 (e.g., bolded arrow) and L0 (non-bolded arrows). The remaining reference motion information (e.g., MRb and the like) can be based on L0 (non-bolded arrows). Accordingly, in the current picture (1610), the motion information (e.g., MVa, MVd, MVg, MVi, MVk, and MVo) can be based on L1 (e.g., bolded arrow with dash) and L0 (non-bolded arrows with dash). The remaining motion information (e.g., MVb and the like) can be based on L0 (non-bolded arrows with dash)

The sub-CU size used in the SbTMVP process can be fixed (or otherwise predetermined, e.g., 8×8 samples) or signaled. In some examples, the SbTMVP process is only applicable to a CU (e.g., a block, a coding block) with a width and a height equal to or greater than 8 samples.

In an example, a combined subblock based merge list that includes a SbTMVP candidate and affine merge candidates is used for the signaling of a subblock based merge mode. The SbTMVP mode can be enabled or disabled by a sequence parameter set (SPS) flag. In some examples, if the SbTMVP mode is enabled, the SbTMVP candidate (also referred to as SbTMVP predictor) is added as a first entry of a list of subblock based merge candidates (e.g., the combined subblock based merge list), and followed by one or more affine merge candidates. In some embodiments, a maximum allowed size of the subblock based merge list is set to five. However, other sizes may be utilized in other embodiments.

In some embodiments, the encoding logic of an additional SbTMVP merge candidate is the same as for the other merge candidates. For example, for each CU in a P slice or a B slice, an additional rate-distortion check can be performed to determine whether to use the SbTMVP candidate.

Affine motion model parameters or affine parameters (e.g., parameters in a 4-parameter affine motion model as shown in Eq. 1, parameters in a 6-parameter affine motion model as shown in Eq. 2 can be used to derive a MV of each pixel (or sample) in a CU (e.g., a block, a luma block), for example, based on Eq. 1 or Eq. 2. However, due to the high complexity and memory access bandwidth requirements for performing pixel-based affine motion compensation, in some embodiments, a subblock-based affine motion compensation is implemented. In the subblock-based affine motion compensation, a current block (e.g., a CU) can be divided into subblocks and each of the subblocks can be assigned with a subblock MV derived from CPMVs of the current block. In an example, a size of the subblocks is 4×4 samples. The subblock-based affine motion compensation may improve coding efficiency and reduce coding complexity and memory access bandwidth.

In some embodiments, a prediction refinement with optical flow (PROF) (also referred to as a PROF method) may be implemented to improve the subblock-based affine motion compensation to have a finer granularity of motion compensation. In an embodiment, after the subblock-based affine motion compensation is performed, differences (or refinement values, refinements, prediction refinements) derived based on an optical flow equation can be added to predicted samples (e.g., luma predicted samples, or luma prediction samples) to obtain refined predicted samples.

Figure 17:
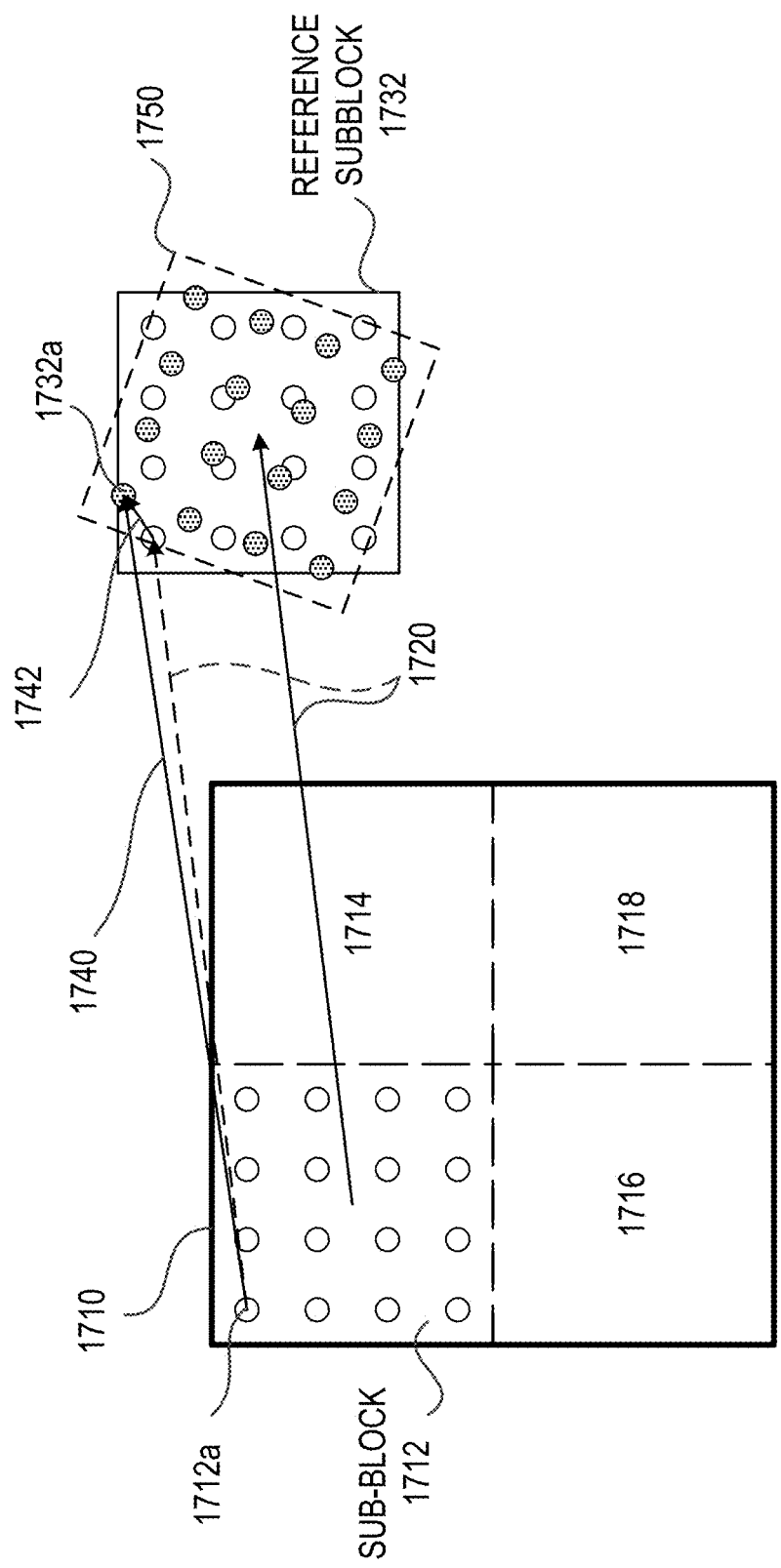
FIG. 17 shows an example of a prediction refinement with optical flow (PROF) method in accordance with an embodiment of the disclosure.

FIG. 17 shows a schematic illustration of an example of the PROF method in accordance with an embodiment of the disclosure. A current block (1710) can be divided into four subblocks (1712, 1714, 1716, and 1718). Each of the subblocks (1712, 1714, 1716, and 1718) can have a size of 4×4 pixels or samples. A subblock MV (1720) for the subblock (1712) can be derived according to CPMVs of the current block 1710, for example, using a center location of the subblock (1712) and an affine motion model (e.g., the 4-parameter affine motion model, the 6-parameter affine motion model). The subblock MV (1720) can point to a reference subblock (1732) in a reference picture. Initial subblock predicted samples can be determined according to the reference subblock (1732).

In some examples, a translational motion from the reference subblock (1732) to the subblock (1712) as described by the subblock MV (1720) may not predict the subblock (1712) with a high accuracy. In addition to the translational motion described by the subblock MV (1720), the subblock (1712) can also experience a non-translational motion (e.g., a rotation as seen in FIG. 17). Referring to FIG. 17, a subblock (1750) in the reference picture having shaded samples (e.g., a sample (1732a)) corresponds to and can be used to reconstruct the samples in the subblock (1712). The shaded sample (1732a) can be shifted by the pixel MV (1740) to reconstruct a sample (1712a) in the subblock (1712) with a high accuracy. Thus, in some examples, when non-translational motion occurs, to improve an accuracy of the prediction, a suitable prediction refinement method can be applied in an affine motion model, as described below.

In an example, the PROF method is implemented using the following four steps. In Step (1), the subblock-based affine motion compensation can be performed to generate a prediction, such as an initial subblock prediction I(i, j), for a current subblock (e.g., the subblock (1712)) where i and j are coordinates corresponding to a sample at position (i, j) (also referred to as a sample position, a sample location) in the current subblock (1712).

In Step (2), gradient calculations can be performed where spatial gradients $g_x(i,j)$ and $g_y(i,j)$ of the initial subblock prediction I(i, j) at each sample position (i, j) can be calculated using, for example, a 3-tap filter [−1, 0, 1] according to Eq. 7 and Eq. 8 as below:

$$g_x(i,j)=I(i+1,j)-I(i-1,j) \quad \text{(Eq. 7)}$$

$$g_y(i,j)=I(i,j+1)-I(i,j-1) \quad \text{(Eq. 8)}$$

The subblock prediction can be extended by one pixel on each side for the gradient calculations. In some embodiments, to reduce the memory bandwidth and complexity, the pixels on the extended borders can be copied from the nearest integer pixel position in the reference picture (e.g., the reference picture including the subblock (1732)). Therefore, additional interpolation for a padding region can be avoided.

In Step (3), a prediction refinement $\Delta I(i,j)$ can be calculated by Eq. 9 (e.g., an optical flow equation) as below.

$$\Delta I(i,j)=g_x(i,j)*\Delta mv_x(i,j)+g_y(i,j)*\Delta mv_y(i,j) \quad \text{(Eq. 9)}$$

where $\Delta mv(i,j)$ (e.g., $\Delta MV$ (1742)) is a difference MV between a pixel MV or a sample MV mv(i,j) (e.g. pixel MV (1740)) for a sample location (i,j) and the subblock MV $Mv_{SB}$ (e.g., the subblock MV (1720)) of the subblock (e.g., the subblock (1712)) where the sample location (i,j) is located. $\Delta mv(i,j)$ can also be referred to as a MV refinement (MVR) for the sample that is at the sample location (i, j) or the sample (i, j). $\Delta mv(i,j)$ can be determined using Eq. 10 as below.

$$\Delta mv(i,j)=mv(i,j)-mv_{SB} \quad \text{(Eq. 10)}$$

$\Delta mv_x(i,j)$ and $\Delta mv_y(i,j)$ are an x component (e.g., a horizontal component) and a y component (e.g., a vertical component) of the difference MV $\Delta mv(i,j)$, respectively.

Since the affine model parameters and the pixel locations relative to the subblock center position are not changed from one subblock to another subblock, $\Delta mv(i,j)$ can be calculated for a first subblock (e.g., the subblock (1712)), and reused for other subblocks (e.g., the subblocks (1714), (1716), and (1718)) in the same current block (1710). In some examples, x and y represent a horizontal shift and a vertical shift of a sample position (i,j) with respect to the center position of the subblock (1712), $\Delta mv(i,j)$ (e.g., including $\Delta mv_x(i,j)$ and $\Delta mv_y(i,j)$) can be derived by Eq. 11 as below, $$\begin{cases} \Delta mv_x(x, y) = a*x + b*y \\ \Delta mv_y(x, y) = c*x + d*y \end{cases} \quad \text{(Eq. 11)}$$

where $\Delta mv_x(x,y)$ is the x component $\Delta mv_x(i,j)$ and $\Delta mv_y(x,y)$ is the y component $\Delta mv_y(i,j)$.

In an example, for a 4-parameter affine motion model, the parameters a-d are described by Eq. 5. For a 6-parameter affine motion model, the parameters a-d are described by Eq. 6 as described above.

In Step (4), the prediction refinement $\Delta I(i,j)$ (e.g., the luma prediction refinement) can be added to the initial subblock prediction I(i, j) to generate another prediction, such as a refined prediction I'(i,j). The refined prediction I'(i,j) can be generated using Eq. 12 as below for the sample (i, j):

$$I'(i,j)=I(i,j)+\Delta I(i,j). \quad \text{(Eq. 12)}$$

According to some aspects of the disclosure, a motion refinement technique that is referred to as bi-directional optical flow (BDOF) mode is used in inter prediction. BDOF is also referred to as BIO in some examples. BDOF can be used to refine a bi-prediction signal of a CU at a 4×4 subblock level. BDOF can be applied to a CU when the CU satisfies certain conditions. In an example, the conditions include: (i) the CU's height is not 4, and the CU size is not 4×8, (ii) the CU is not coded using affine mode or the ATMVP merge mode, (iii) the CU is coded using a "true" bi-prediction mode, e.g., one of the two reference pictures is prior to the current picture in a display order and the other is after the current picture in the display order. BDOF is only applied to a luma component in some examples. In an example, the conditions include: (i) the CU is coded using the "true" bi-prediction mode, e.g., one of the two reference pictures is prior to the current picture in a display order and the other is after the current picture in the display order, (ii) the distances (i.e., POC differences) from the two reference pictures to the current picture are identical, (iii) the two reference pictures are short-term reference pictures, (iv) the CU is not coded using affine mode or the ATMVP merge mode, (v) the CU has more than 64 luma samples, (vi) a CU height and a CU width are larger than or equal to 8 luma samples, (vii) a BCW weight index indicates an equal weight, (viii) a weighted prediction (WP) is not enabled for the current CU, and (ix) a CIIP mode is not used for the current CU.

In an embodiment, the BDOF mode is only applied to a luma component. The motion refinement in the BDOF mode is based on the optical flow concept, which assumes that the motion of an object is smooth. For each 4×4 subblock (e.g., a subblock (1820) in a CU (1810) in FIG. 18), a motion refinement ($\Delta mv_x, \Delta mv_y$) is calculated by minimizing a difference between the L0 and L1 prediction samples. The motion refinement is then used to adjust the bi-predicted sample values in the 4×4 sub-block (e.g., the subblock (1820)). The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j),$$

k=0,1, of the two prediction signals are computed by directly calculating the difference between two neighboring samples, e.g., $$\frac{\partial I^{(k)}}{\partial x}(i, j) = (I^{(k)}(i+1, j) - I^{(k)}(i-1, j)) \gg \text{shift1} \quad \text{(Eq. 13)}$$

$$\frac{\partial I^{(k)}}{\partial y}(i, j) = (I^{(k)}(i, j+1) - I^{(k)}(i, j-1)) \gg \text{shift1}$$

where $I^{(k)}(i, j)$ is the sample value at coordinate (i, j) of the prediction signal in list k, k=0,1, and the parameter shift1 is calculated based on a luma bit depth, bitDepth. In an example, shift1=max(6, bitDepth-6). In some examples, shift1 is equal to a maximum of 2 and (14-bitDepth). In an example, calculations in Eq. 13 can be adapted to calculations in Eqs. 14-15.

$$\frac{\partial I^{(k)}}{\partial x}(i, j) = ((I^{(k)}(i+1, j) \gg \text{shift1}) - (I^{(k)}(i-1, j) \gg \text{shift1})) \quad \text{(Eq. 14)}$$

$$\frac{\partial I^{(k)}}{\partial y}(i, j) = ((I^{(k)}(i, j+1) \gg \text{shift1}) - (I^{(k)}(i, j-1) \gg \text{shift1})) \quad \text{(Eq. 15)}$$

In an example, auto-correlations and cross-correlations of gradients, $S_1, S_2, S_3, S_5$ and $S_6$, are calculated as below.

$$S_1 = \Sigma_{(i,j) \in \Omega} \psi_x(i, j) \cdot \psi_x(i, j), \quad S_3 = \Sigma_{(i,j) \in \Omega} \theta(i, j) \cdot \psi_x(i, j) \quad \text{(Eq. 16)}$$

$$S_2 = \Sigma_{(i,j) \in \Omega} \psi_x(i, j) \cdot \psi_y(i, j)$$

$$S_5 = \Sigma_{(i,j) \in \Omega} \psi_y(i, j) \cdot \psi_y(i, j) \quad S_6 = \Sigma_{(i,j) \in \Omega} \theta(i, j) \cdot \psi_y(i, j)$$

where $$\psi_x(i, j) = \left(\frac{\partial I^{(1)}}{\partial x}(i, j) + \frac{\partial I^{(0)}}{\partial x}(i, j)\right) \gg n_a \quad \text{(Eq. 17)}$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = (I^{(1)}(i, j) \gg n_b) - (I^{(0)}(i, j) \gg n_b)$$

and $\Omega$ is a 6×6 window (e.g., (1840)) around the 4×4 subblock (e.g., the subblock (1820)), and the values $n_a$ and $n_b$ are set equal to min(5, bitDepth-7) and min(8, bitDepth-4), respectively.

In an example, the auto-correlations and cross-correlations of gradients, $S_1, S_2, S_3, S_5$ and $S_6$, are calculated as below using Eq. 18.

$$S_1 = \Sigma_{(i,j) \in \Omega} \text{Abs}(\psi_x(i,j)), \quad S_3 = \Sigma_{(i,j) \in \Omega} \theta(i,j) \cdot \text{Sign}(\psi_x(i,j))$$

$$S_2 = \Sigma_{(i,j) \in \Omega} \psi_x(i,j) \cdot \text{Sign}(\psi_y(i,j))$$

$$S_5 = \Sigma_{(i,j) \in \Omega} \text{Abs}(\psi_y(i,j)), \quad S_6 = \Sigma_{(i,j) \in \Omega} \theta(i,j) \cdot \text{Sign}(\psi_y(i,j)) \quad \text{(Eq. 18)}$$

where $\Omega$ is a 6×6 window (e.g., (1840)) around the 4×4 subblock (e.g., the subblock (1820)), and the values $n_a$ and $n_b$ are set equal to min(1, bitDepth-11) and min(4, bitDepth-8), respectively.

The motion refinement or MVR ($\Delta mv_x, \Delta mv_y$) can be derived using the auto-correlations and cross-correlations using the following.

$$\Delta mv_x = S_1 > 0 ? \text{clip3}(-\text{th}'_{BIO}, \text{th}'_{BIO}, -((S_3 \cdot 2^{n_b - n_a}) \gg \lfloor \log_2 S_1 \rfloor)) : 0 \quad \text{(Eq. 19)}$$

$$\Delta mv_y = S_5 > 0 ? \text{clip3}(-\text{th}'_{BIO}, \text{th}'_{BIO}, -((S_6 \cdot 2^{n_b - n_a} - ((v_x S_{2,m}) \ll n_{S_2} + v_x S_{2,s})/2) \gg \lfloor \log_2 S_5 \rfloor)) : 0 \quad \text{(Eq. 20)}$$

where $S_{2,m} = S_2 \gg n_{S_2}$, $$S_{2,s} = S_2 \& (2^{n_{S_2}} - 1),$$

$\lfloor \cdot \rfloor$ is the floor function, and $n_{S_2}=12$. In an example, $\text{th}'_{BIO}=2^{\max(5, BD-7)}$. In an example, $\text{th}'_{BIO}=2^{13-BD}$.

Based on the motion refinement and the gradients, the following adjustment (or prediction refinement) b(x,y) can be calculated for each sample in the 4×4 subblock:

$$b(x, y) = \text{rnd}\left(\frac{\left(\Delta mv_x \left(\frac{\partial I^{(1)}(x, y)}{\partial x} - \frac{\partial I^{(0)}(x, y)}{\partial x}\right) + \Delta mv_y \left(\frac{\partial I^{(1)}(x, y)}{\partial y} - \frac{\partial I^{(0)}(x, y)}{\partial y}\right) + 1\right)}{2}\right) \quad \text{(Eq. 21)}$$

In an example, the above calculations in Eq. (21) can be adapted to the following calculations in Eq. 22.

$$b(x, y) = \text{rnd}\left(\left(\Delta mv_x \left(\frac{\partial I^{(1)}(x, y)}{\partial x} - \frac{\partial I^{(0)}(x, y)}{\partial x}\right)\right)/2\right) + \text{rnd}\left(\left(\Delta mv_y \left(\frac{\partial I^{(1)}(x, y)}{\partial y} - \frac{\partial I^{(0)}(x, y)}{\partial y}\right)\right)/2\right) \quad \text{(Eq. 22)}$$

where the function 'rnd' represents a rounding operation.

The BDOF samples of the CU can be calculated by adjusting the bi-prediction samples as follows:

$$\text{Pred}_{BDOF}(x,y) = (I^{(0)}(x,y) + I^{(1)}(x,y) + b(x,y) + o_{offset}) \gg \text{shift} \quad \text{(Eq. 23)}$$

In an embodiment, the values are selected such that multipliers in the BDOF process do not exceed 15-bit, and the maximum bit-width of the intermediate parameters in the BDOF process is kept within 32-bit.

Figure 18:
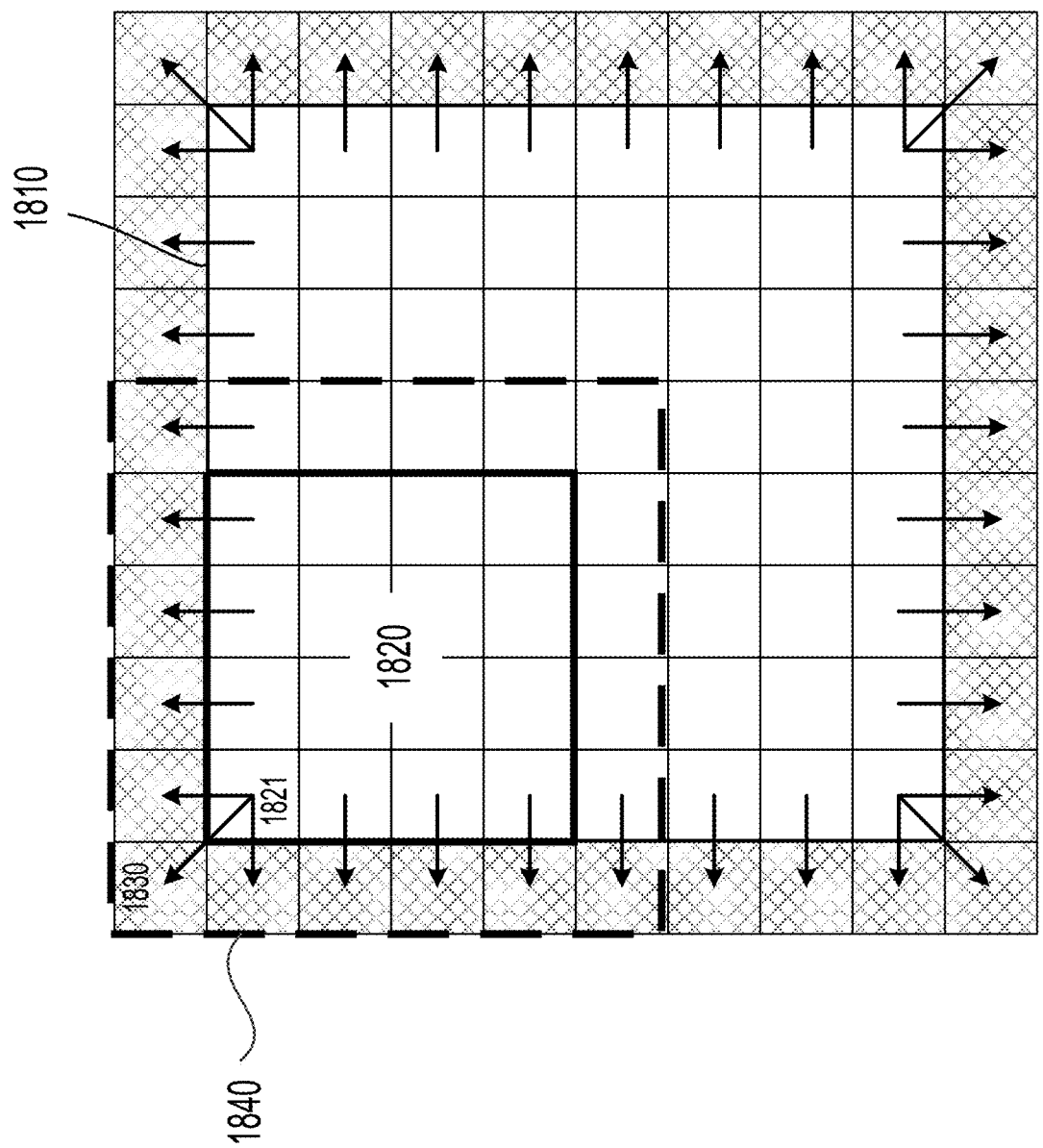
FIG. 18 shows an example of an extended row/column around boundaries of a coding unit in a bi-directional optical flow (BDOF) method in accordance with an embodiment of the disclosure.

In an example, to derive the gradient values, prediction samples $I^{(k)}(i, j)$ in the list k (k=0,1) that are outside the current CU boundaries are to be generated. Referring to FIG. 18, the BDOF (e.g., in VVC) can use an extended row/column around boundaries of a CU (1810). In order to control a computational complexity of generating out-of-boundary prediction samples (e.g., a prediction for a sample (1830) or a prediction sample (1830)), prediction samples in the extended area (patterned areas in FIG. 18) can be generated by taking reference samples at nearby integer positions (e.g., using a floor operation on the coordinates) directly without interpolation. In an example, an 8-tap motion compensation interpolation filter (also referred to as an 8-tap interpolation filter) is used to generate prediction samples within the CU (1810) (white positions). In an example shown in FIG. 18, the CU (1810) includes 8×8 samples. In an example, the extended sample values are used in gradient calculations only. The gradient calculations can use Eq. 13 or Eqs. 14-15, as described above.

Referring to FIG. 18, for the remaining steps (e.g., Eqs. 16-18) in the BDOF process, if prediction sample(s) and gradient value(s) outside the CU boundaries are used, the prediction sample(s) and the gradient value(s) outside the CU boundaries can be padded (e.g., repeated) from corresponding nearest neighbors as indicated by arrows in FIG. 18. For example, the prediction sample and the gradient values at (1830) can be padded from the corresponding prediction sample and the gradient values at (1821).

In an embodiment, when the width and/or the height of a CU is larger than 16 luma samples, the CU can be split into subblocks with a width and/or a height equal to 16 luma samples, and the subblock boundaries can be treated as the CU boundaries in the BDOF process. For example, a maximum unit size for the BDOF process is limited to 16×16 samples. In an example, for a subblock, the BDOF process can be skipped. In an example, when the SAD between the initial L0 and L1 prediction samples is smaller than a threshold, the BDOF process is not applied to the subblock. The threshold can be set equal to (8×W×(>>1)) where W indicates a subblock width and H indicates a subblock height. To avoid the additional complexity of SAD calculation, the SAD between the initial L0 and L1 prediction samples calculated in a DVMR process can be reused here.

If BCW is enabled for a current CU (e.g., a block), e.g., a BCW weight index indicates an unequal weight, the BDOF mode can be disabled for the current CU. Similarly, if the WP mode is enabled for a current CU (e.g., a block), e.g., a luma_weight_1x_flag is 1 for either of two reference pictures for the current CU, the BDOF mode can be disabled for the current CU. When a current CU (e.g., a block) is coded with a symmetric MVD mode or a CIIP mode, the BDOF mode can be disabled for the current CU.

According to an aspect of the disclosure, a MV refinement (MVR) can be restricted to be, for example, in a form of $+2^N$ or $-2^N$, and thus multiplication operations such as in Eqs. 9, 21, and/or 22 can be replaced by shifting operations to reduce calculation complexity and to improve coding efficiency. N can be any suitable integer.

According to an aspect of the disclosure, in an affine PROF mode (e.g., the subblock-based affine motion model with the PROF), a MVR can be restricted so that corresponding multiplication operations that use the MVR can be replaced by shifting operations.

To restrict MVR values (e.g., an x component of a MVR and/or a y component of the MVR) to be in a form of a power of 2, e.g., $+2^N$ or $-2^N$, where N is any suitable integer, the derivation logics can be simplified as described below.

In some examples, in an adaptive affine motion compensation, when a maximum of absolute values of affine parameters is below a threshold, a 4×4 subblock size and/or a 6-tap interpolation filter can be changed to an 8×8 subblock size and/or an 8-tap interpolation filter. In some examples, a subblock width and a subblock height can be separately set according to the affine parameters. In some examples, a horizontal interpolation filter type and a vertical interpolation filter type can be set separately according to the affine parameters.

According to aspects of the disclosure, coding information of a current block (CB) can be decoded from a coded video bitstream. The coding information can indicate an inter prediction mode for the CB that includes a plurality of subblocks. Initial predictions (e.g., I(i, j) used in the PROF, a combination (e.g., a summation) based on $I^{(0)}(x,y)$ and $I^{(1)}(x,y)$ in the BDOF mode) for samples in a subblock of the plurality of subblocks can be generated based on the inter prediction mode. For one of the samples in the subblock, a MVR, such as a MVR used in the PROF or the BDOF, can be determined where an absolute value of a first component of the MVR is one of: (i) $2^{N1}$ and (ii) a sum or a difference of $2^{N1}$ and $2^{M1}$. N1 and M1 can be any suitable integers. In an example, the absolute value of the first component of the MVR can be based on more than two powers of 2, such as $2^2-2^{-1}+2^{-2}$.

The first component of the MVR is in a first direction that is one of an x direction and a y direction. Thus, the first component of the MVR can be one of: an x component and a y component of the MVR. A prediction refinement based on the MVR and spatial gradients can be generated for the one of the samples where the spatial gradients can be based on the initial predictions for the samples. A refined prediction can be generated based on the initial prediction of the one of the samples and the prediction refinement.

In an embodiment, the spatial gradients include a first spatial gradient in the first direction and a second spatial gradient in a second direction that is another one of the x direction and the y direction. For example, the first spatial gradient is an x component, such as $$\frac{\partial I^{(k)}}{\partial x}(i,j)$$

(k=0 or 1) for a bi-prediction in the BDOF mode or $g_x(i,j)$ in the PROF. The MVR can include a second component that is in the second direction where an absolute value of the second component of the MVR can be one of: (i) $2^{N2}$ and (ii) a sum or a difference of $2^{N2}$ and $2^{M2}$. N2 and M2 can be any suitable integers.

Further, a first refinement can be determined based on one of: (i) shifting the first spatial gradient by |N1| bits and (ii) separately shifting the first spatial gradient by |N1| and |M1| bits respectively and combining (e.g., adding, subtracting) the shifted first spatial gradients. Similarly, a second refinement can be determined based on one of: (i) shifting the second spatial gradient by |N2| bits and (ii) separately shifting the second spatial gradient by |N2| and |M2| bits respectively and combining (e.g., adding, subtracting) the shifted second spatial gradients. In an example, shifting corresponds to left-shifting when N1, M1, N2, or M2 is larger than 0, and shifting corresponds to right-shifting when N1, M1, N2, or M2 is less than 0. The prediction refinement can be generated based on the first refinement and the second refinement.

For example, the first direction is the x direction and the second direction is the y direction. Thus, the first component of the MVR is an x component of the MVR in the form of $2^{-2}$ and the second component of the MVR is a y component of the MVR in the form of $2^{1}\text{-}2^{-2}$. Accordingly, N1, N2, and M2 can be −2, 1, and −2, respectively. The first spatial gradient is the x component and the second spatial gradient is the y component. The first refinement can be determined by right-shifting the first spatial gradient by 2 bits (that is equivalent to dividing the first spatial gradient by 4). The second spatial gradient can be left-shifted by 1 bit (that is equivalent to multiplying the second spatial gradient by 2) to obtain one shifted second refinement. The second spatial gradient can be right-shifted by 2 bit (that is equivalent to dividing the second spatial gradient by 4) to obtain another shifted second refinement. Further, the second refinement can be calculated as the one shifted second refinement minus the other shifted second refinement. As seen above, multiplications/divisions can be simplified to shifts or shifts with addition/subtractions. As calculation complexity of shifts and addition/subtractions are less than that of multiplications/divisions, computational efficiency is improved by restricting a component (e.g., an x component and/or a y component) to be a power of 2 or a linear combination of powers of 2 (e.g., a sum of two powers of 2, a difference of two powers of 2, or a linear combination of more than two powers of 2).

In an embodiment, an initial MVR is determined for the one of the samples in the subblock based on the inter prediction mode. Subsequently, a first component of the initial MVR can be rounded to be the first component of the MVR. For example, the inter prediction mode is the sub-block-based affine motion model with the PROF. Referring to FIG. 17, for the one (e.g., the sample (1712a)) of the samples in the subblock, a sample MV or a pixel MV (e.g., the sample MV (1740)) of the one of the samples and a subblock MV (e.g., the subblock MV (1720)) of the subblock can be determined based on the subblock-based affine motion model (e.g., the 4-parameter affine motion model, the 6-parameter affine motion model). The initial MVR (e.g., $\Delta mv(i,j)$) can be determined based the sample MV and the subblock MV, for example, using Eq. 10.

The PROF process including the four steps as described in FIG. 17 can be suitably adapted as follows: Steps (1), (2), and (4) can remain the same as those described in FIG. 17 and Step 3 can be adapted. For example, in Step 3, the MV difference (e.g., $\Delta mv(i,j)$) calculated using Eq. (10) can be the initial MVR. After obtaining the initial MVR (e.g., $\Delta mv(i, j)$ in Eq. 10), the first component (e.g., an x component) of the initial MVR can be rounded to be the first component of the MVR. Further, the second component (e.g., a y component) of the initial MVR can be rounded to be the second component of the MVR. Accordingly, the prediction refinement can be obtained based on a modification of Eq. (9) where a multiplication operation of $g_x(i,j)$ and the x component of the MVR can be replaced with shifting operation(s). Further, when the x component of the MVR is a linear combination of powers of 2 (e.g., $2^{N1}+2^{M1}$), an addition/subtraction operation is performed after the shifting operations. The above description can be applicable to replacing a multiplication operation of $g_y(i,j)$ and the y component of the MVR with shifting operation(s) and an optional addition/subtraction operation.

According to aspects of the disclosure, when calculating the MVR (or the affine subblock MVR), for example, in Eq. 10, the MV components (e.g., the x component or a horizontal component, the y component or a vertical component, the first component, or the second component) of the MVR can be restricted to be in the form of power(s) of 2, such as, $+2^N$, $-2^N$, $(\pm 2^N \pm 2^M)$, or the like where N and M can be any integers. Accordingly, the prediction refinement calculation such as in Eq. 9 can use shifting operations instead of multiplications/divisions, as described above.

One of the MV components of the initial MVR can be rounded towards a closest $+2^N$ or $-2^N$ with a higher priority to a smaller value of N in case of an equal distance. For example, when an absolute value of the one of the MV components of the initial MVR is $1.5 \times 2^N$ that is at an equal distance from $2^N$ and $2^{N+1}$, the one of the MV components of the MVR can be rounded to $+2^N$ or $-2^N$. Thus, when the absolute value of the one of the MV components of the initial MVR is larger than $1.5 \times 2^{N-1}$ and no larger than $1.5 \times 2^N$, the one of the MV components of the MVR can be $+2^N$ or $-2^N$.

One of the MV components of the initial MVR can be rounded towards a closest $+2^N$ or $-2^N$ with a higher priority to a larger value of N in case of an equal distance. For example, when an absolute value of the one of the MV components of the initial MVR is $1.5 \times 2^{N-1}$ that is at an equal distance from $2^{N-1}$ and $2^N$, respectively, the one of the MV components of the MVR can be rounded to $+2^N$ or $-2^N$. Thus, when the absolute value of the one of the MV components of the initial MVR is no smaller than $1.5 \times 2^{N-1}$ and less than $1.5 \times 2^N$, the one of the MV components of the MVR can be $+2^N$ or $-2^N$.

Based on the descriptions above, the first component of the MVR can be $2^{N1}$ or $-2^{N1}$ when an absolute value of the first component of the initial MVR is no smaller than $1.5 \times 2^{N1-1}$ and less than $1.5 \times 2^{N1}$. Alternatively, the first component of the MVR can be $2^{N1}$ or $-2^{N1}$ when an absolute value of the first component of the initial MVR is larger than $1.5 \times 2^{N1-1}$ and no larger than $1.5 \times 2^{N1}$.

Similarly, the second component of the MVR can be $2^{N2}$ or $-2^{N2}$ when an absolute value of the second component of the initial MVR is no smaller than $1.5 \times 2^{N2-1}$ and less than $1.5 \times 2^{N2}$. Alternatively, the second component of the MVR can be $2^{N2}$ or $-2^{N2}$ when an absolute value of the second component of the initial MVR is larger than $1.5 \times 2^{N2-1}$ and no larger than $1.5 \times 2^{N2}$.

In an embodiment, one of the MV components of the initial MVR can be rounded towards a closest sum of multiple powers of 2, such as $(2^N+2^M)$ or $-(2^N+2^M)$. M and N are any suitable integers. In an example, N=0 and M=−1, and the one of the MV components of the MVR is equal to 1.5 or −1.5. In some examples, when multiple powers of 2 (e.g., $2^N$ and $2^M$) are used, the one of the MV components of the MVR represents the one of the MV components of the initial MVR more accurately than that using a single power of 2.

For example, the first component of the MVR is $(2^{N1}+2^{M1})$ or $-(2^{N1}+2^{M1})$. In an example, the second component of the MVR is $(2^{N2}+2^{M2})$ or $-(2^{N2}+2^{M2})$.

In an embodiment, the inter prediction mode is the bi-prediction mode with the BDOF mode, as described above. The initial MVR (e.g., $(\Delta mv_x, \Delta mv_y)$ in Eqs. 19-20) is for the subblock in the CB. For the one of the samples in the subblock, the initial MVR can be determined based on the initial predictions for the samples in the subblock and the BDOF for the subblock, for example, by using Eqs. 19-20 and a plurality of Eqs. 13-18.

The BDOF mode described above can be suitably adapted, for example, by (i) adding a step that rounds at least one of the MV components of the initial MVR to a power of 2 or multiple powers of 2, and (ii) modifying calculations in Eq. 21 or Eq. 22. For example, after obtaining the initial MVR (e.g., $(\Delta mv_x, \Delta mv_y)$ in Eqs. 19-20), the first component (e.g., an x component) of the initial MVR can be rounded to be the first component (e.g., in a form of power(s) of 2) of the MVR. Further, the second component (e.g., a y component) of the initial MVR can be rounded to be the second component (e.g., in a form of power(s) of 2) of the MVR. Accordingly, the prediction refinement (e.g., b(x,y)) can be obtained based on a modification of Eq. (21) or Eq. (22). Referring to Eq. (21), a multiplication operation of $$\left(\frac{\partial I^{(1)}(x, y)}{\partial x} - \frac{\partial I^{(0)}(x, y)}{\partial x}\right)$$

and the x component of the MVR can be replaced with shifting operation(s). Further, when the x component of the MVR is a linear combination of powers of 2 (e.g., $2^{N1}+2^{M1}$), an addition/subtraction operation can be performed after the shifting operations. The above description can be applicable to replacing a multiplication operation of $$\frac{\partial I^{(1)}(x, y)}{\partial y} - \frac{\partial I^{(0)}(x, y)}{\partial y}$$

and the y component of the MVR with shifting operation(s) and an optional addition/subtraction operation.

In general, when restricting an input value to be a power of 2, such as in MVR calculations in the BDOF mode, the PROF mode, and/or the like, fast calculations (e.g., shifting operations) can be used to reduce complexity. According to aspects of the disclosure, a rounding operation of the input value (e.g., denoted as v) can be implemented by utilizing a position (e.g., denoted as p) of a most significant bit (MSB) of the input value v. The position p can be a non-negative integer. In an example, the rounding operation of the input value v can be implemented by a shifting operation based on the position p.

In an embodiment, an absolute value of an output value (e.g., denoted as v') corresponding to the input value v can be determined by left-shifting 1 by p bits. Thus, the output value v' after the rounding operation can be calculated using Eq. 24 below.

$$v' = \begin{cases} (1 << p), \text{ if } v \geq 0 \\ -(1 << p), \text{ if } v < 0 \end{cases} \quad \text{(Eq. 24)}$$

When the input value v is larger than or equal to 0, the output value v' is obtained by directly left-shifting a bit value of 1 (or 1) by p bits. When the input value v is less than 0, the absolute value of the output value v' is directly obtained by left-shifting the bit value of 1 (or 1) by p bits and a sign of the output value v' is negative.

In an embodiment, the absolute value of the first component of the initial MVR can be rounded to a nearest power of 2 that is one of: $2^p$ and $2^{p+1}$ by left-shifting the bit value of 1 (or 1) by p or (p+1) bits. Accordingly, the absolute value of the first component of the MVR can be $2^p$ or $2^{p+1}$.

According to an aspect of the disclosure, whether an absolute value of the input value v is larger than $1.5 \times 2^P$ can be determined, when the absolute value of the input value v is larger than $1.5 \times 2^P$, an absolute value of the output value v' can be obtained by left-shifting the bit value of 1 (or 1) by (p+1) bits, and thus the absolute value of the output value v' is $2^{p+1}$. When the absolute value of the input value v is not larger than $1.5 \times 2^P$, the absolute value of the output value v' can be obtained by left-shifting the bit value of 1 (or 1) by p bits, and thus the absolute value of the output value v' is $2^p$. The output value v' can be obtained by using Eq. 25 below.

$$v' = \begin{cases} (v < 0 ? -1:1) \times (1 << (p+1)), \text{ if } |v| - (1 << p) > (1 << (p-1)) \\ (v < 0 ? -1:1) \times (1 << p), \text{ otherwise} \end{cases} \quad \text{(Eq. 25)}$$

Alternatively, Eq. 25 can be adapted into Eq. 26.

$$v' = \text{sign}(v) \cdot (1 << (p + (|v| - (1 << p) > (1 << (p-1))))) \quad \text{(Eq. 26)}$$

According to an aspect of the disclosure, when the input value v is a ratio of a first value a and a second value b, e.g., v=a/b. The output value v' (e.g., the rounded output value v') can be calculated from the first value a and the second value b directly based on a first position p1 of a MSB of the first value a and a second position p2 of a MSB of the second value b, respectively. p1 and p2 can be non-negative integers.

In an embodiment, the rounding process can include the following steps. In Step 1, the first position p1 of the MSB of the first value a and the second position p2 of the MSB of the second value b can be determined. In Step 2, a sign (e.g., denoted as $\text{sign}_v$) of the input value v, can be obtained using Eq. 27.

$$\text{sign}_v = (a \times b < 0) ? -1:1 \quad \text{(Eq. 27)}$$

Further, the output value v' can be calculated using Eq. 28.

$$v' = \text{sign}_v \times 2^{(p1-p2)} \quad \text{(Eq. 28)}$$

The descriptions above regarding the rounding operations that are based on the position p of the MSB of the input value v can simplify the rounding operations in hardware and/or software design. Since an operation to obtain the MSB position p is simple, and in various examples, additional operations to obtain the output value v' (e.g., Eqs. 24-28) only include shifting and addition/subtractions, the complexity of a rounding process can be potentially reduced by using the rounding operations based on the position p of the MSB of the input value v.

According to aspects of the disclosure, the input value v can be one of the MV components of the initial MVR. For example, the input value v can be the first component of the initial MVR, the second component of the initial MVR, the x component of the initial MVR, or the y component of the initial MVR.

In an embodiment, the input value v is the first component of the initial MVR, and the position p refers to a position of a MSB of the first component of the initial MVR. The first component of the initial MVR can be rounded based on the position p. The position p can be a non-negative integer.

In an example, a bit value of 1 (or 1) can be left-shifted by p bits to obtain the absolute value of the first component of the MVR as $2^p$.

In an example, the absolute value of the first component of the initial MVR can be rounded to a nearest power of 2 that is one of: $2^p$ and $2^{p+1}$ by left-shifting the bit value of 1 (or 1) by p or (p+1) bits. Accordingly, the absolute value of the first component of the MVR can be $2^p$ or $2^{p+1}$. For example, whether the absolute value of the first component of the initial MVR is larger than $1.5 \times 2^P$ can be determined. When the absolute value of the first component of the initial MVR is determined to be larger than $1.5 \times 2^P$, the bit value of 1 (or 1) can be left-shifted by (p+1) bits to obtain the absolute value of the first component of the MVR as $2^{p+1}$. When the absolute value of the first component of the initial MVR is determined to be not larger than $1.5 \times 2^P$, the bit value of 1 (or 1) can be left-shifted by p bits to obtain the absolute value of the first component of the MVR as $2^p$.

As described above, when the first component of the initial MVR is the ratio of the first value a over the second value b, the first component of the initial MVR can be rounded based on the first position p1 of the MSB of the first value and the second position p2 of the MSB of the second value, respectively. p1 and p2 can be non-negative integers.

According to aspects of the disclosure, coding information of a current block (CB) (e.g., the CB (1300)) can be decoded from a coded video bitstream. The coding information can indicate that the CB is coded with a subblock-based affine motion model. The subblock-based affine motion model can include affine parameters that can be based on multiple CPMVs (e.g., $\vec{v_0}$ and $\vec{v_1}$ in FIG. 13) for the CB. Further, the CB can include an affine subblock (e.g., the subblock (1302)) having a subblock MV (e.g., the subblock MVs (1301)). The CB can include additional affine subblock(s) that have additional subblock MV(s).

Whether to select a subblock characteristic for generating a prediction for a sample in the affine subblock based on the subblock MV can be determined based on the coding information. In response to selecting the subblock characteristic, the subblock characteristic can be determined based on at least one of the affine parameters. The subblock characteristic can indicate one of: (i) a subblock size used for generating the prediction for the sample and (ii) an interpolation filter type for the affine subblock. Further, the sample in the affine subblock can be reconstructed based on the determined subblock characteristic.

The affine parameters can be determined based on the CPMVs of the CB. In an embodiment, the subblock-based affine motion model is based on the 4-parameter affine motion model, as shown in FIG. 12A and described by Eq. (1) and Eqs. (3)-(5). Referring to FIG. 12A, the CB (e.g., (1210A)) includes a top left CP (e.g., CP0) having a first CPMV (e.g., CPMV$_0$) and a top right CP (e.g., CP1) having a second CPMV (e.g., CPMV$_1$). The affine parameters can include a first affine parameter $$\left(\text{e.g., } a = \frac{mv_{1x} - mv_{0x}}{w}\right)$$

and a second affine parameter $$\left(\text{e.g., } c = \frac{mv_{1y} - mv_{0y}}{w}\right).$$

The first affine parameter (e.g., 'a') can indicate a ratio of an x component of a first MV difference between the second CPMV and the first CPMV over a width (e.g., w) of the CB. The second affine parameter (e.g., 'c') can indicate a ratio of a y component of the first MV difference over the width of the CB.

In an embodiment, the subblock-based affine motion model is based on the 6-parameter affine motion model, as shown in FIG. 12B and described by Eq. (2)-(4) and Eq. (6). Referring to FIG. 12B, the CB (e.g., (1210B)) includes a top left CP (e.g., CP0) having a first CPMV (e.g., CPMV$_0$), a top right CP (e.g., CP1) having a second CPMV (e.g., CPMV$_1$), and a bottom left CP (e.g., CP2) having a third CPMV (e.g., CPMV$_2$). The affine parameters include a first affine parameter $$\left(\text{e.g., } a = \frac{mv_{1x} - mv_{0x}}{w}\right),$$

a second affine parameter $$\left(\text{e.g., } c = \frac{mv_{1y} - mv_{0y}}{w}\right),$$

a third affine parameter $$\left(\text{e.g., } b = \frac{mv_{2x} - mv_{0x}}{h}\right),$$

and a fourth affine parameter $$\left(\text{e.g., } d = \frac{mv_{2y} - mv_{0y}}{h}\right).$$

The first affine parameter and the second affine parameters can be identical to the first affine parameter and the second affine parameter in the 4-parameter affine motion model, and thus detailed descriptions are omitted for purposes of brevity. The third affine parameter (e.g., 'b') can indicate a ratio of an x component of a second MV difference between the third CPMV and the first CPMV over a height (e.g., h) of the CB. The fourth affine parameter (e.g., 'd') can indicate a ratio of a y component of the second MV difference over the height of the CB.

In an embodiment, one or more of the affine parameters represent an average MV difference of two adjacent pixels (or samples) along a direction (e.g., a horizontal direction (width), a vertical direction (height)) in the CB. For example, the first affine parameter 'a' and the second parameter 'c' represent an average MV difference (MVD) of two adjacent pixels along the horizontal direction (width). Further, the first affine parameter 'a' represents the x component, and the second affine parameter 'c' represents the y component. For example, the third affine parameter 'b' and the fourth parameter 'd' represent an average MVD of two adjacent pixels along the vertical direction (height). Further, the third affine parameter 'b' represents the x component, and the fourth affine parameter 'd' represents the y component.

In addition to or instead of including 'a', 'b', 'c', and/or 'd' as described above in the affine parameters, the affine parameters can include other parameters to describe various motions of the CB, such as zooming in/zooming out (also referred to as scaling), rotation, and/or the like.

In addition to the affine parameters described above, the translational motion related parameters 'e' and 'f' can be derived using Eq. 4 as above.

In an example, the 4-parameter affine motion model can be described using 4 parameters, such as the first affine parameter $$\left(\text{e.g.}, a = \frac{mv_{1x} - mv_{0x}}{w}\right),$$

the second affine parameter $$\left(\text{e.g.}, c = \frac{mv_{1y} - mv_{0y}}{w}\right),$$

e, and f. In an example, the 6-parameter affine motion model can be described using 6 parameters, such as the first affine parameter $$\left(\text{e.g.}, a = \frac{mv_{1x} - mv_{0x}}{w}\right),$$

the second affine parameter $$\left(\text{e.g.}, c = \frac{mv_{1y} - mv_{0y}}{w}\right),$$

the third affine parameter $$\left(\text{e.g.}, b = \frac{mv_{2x} - mv_{0x}}{h}\right),$$

and the fourth affine parameter $$\left(\text{e.g.}, d = \frac{mv_{2y} - mv_{0y}}{h}\right),$$

e, and f.

In an embodiment, the subblock size is one of: a width of the affine subblock, a height of the affine subblock, a width of an affine PROF subblock used in the PROF for the CB, a height of the affine PROF subblock, a width of a gradient subblock used in gradient calculations in the PROF, and a height of the gradient subblock. The interpolation filter type is one of: (i) a first interpolation filter having the first length (e.g., a 6-tap) for horizontal interpolation, (ii) a second interpolation filter having the second length (e.g., an 8-tap) for the horizontal interpolation, (iii) a first interpolation filter having the first length for vertical interpolation, and (iv) a second interpolation filter having the second length for the vertical interpolation. As described above, the second length is larger than the first length.

When the CB is coded with the subblock-based affine motion model, each of the following may be conditionally switchable based on the at least one of the affine parameters: the affine subblock size, the width of the affine subblock, the height of the affine subblock, the interpolation filter type, an affine PROF subblock size, the width of the affine PROF subblock, the height of the affine PROF subblock, a gradient subblock size, the width of the gradient subblock, and the height of the gradient subblock.

In an embodiment, an interpolation filter tap length (e.g., 6-tap, 8-tap) and/or parameters for the subblock-based affine motion compensation may be selected separately for the horizontal interpolation and the vertical interpolation.

In an embodiment, a width and a height of a subblock (e.g., an affine subblock, an affine PROF subblock, a gradient subblock) may be chosen separately according to the at least one of the affine parameters.

In an embodiment, the affine parameters used in a condition checking may be a subset of the affine parameters or a combination of one or more of the affine parameters.

In an embodiment, different affine parameters or different subsets of the affine parameters may be used separately for condition checks for multiple switchable subblock characteristics. As described above, the subblock characteristic (e.g., the affine subblock size) can be determined based on the at least one (e.g., a maximum value of $\{|a|, |c|\}$) of the affine parameters. In an example, another subblock characteristic (e.g., the interpolation filter type) is determined based on at least another one (e.g., a minimum value of $\{|a|, |c|\}$, a maximum value of $\{|a|, |b|, |c|, |d|\}$) of the affine parameters. The at least another one of the affine parameters can be different from or identical to the at least one of the affine parameters, and the other subblock characteristic can be different from the subblock characteristic.

In an embodiment, one or more conditions applied on the selected affine parameters may be one of the followings or any combination of the followings: a minimum value, a maximum value, a minimum absolute value, a maximum absolute value, a range of values, and/or a mean value. In an example, the at least one of the affine parameters includes the plurality of the affine parameters. The subblock characteristic can be determined based on one of (i) a threshold and a minimum value, a maximum value, a minimum absolute value, a maximum absolute value, or a mean value of the plurality of the affine parameters and (ii) a pre-defined range (e.g., [M, N]) and a value range of the plurality of the affine parameters.

In some examples, the 6-parameter affine motion model is used as an example. The affine parameters a, b, c and d described above using Eq. (7) and (9) can be used for determining the affine subblock size, the interpolation filter type (or the interpolation filter tap length), the applicability of a PROF process on affine, and/or the like. The descriptions can be suitably adapted to other affine motion model(s) (e.g., the 4-parameter affine motion model).

In an embodiment, the at least one of the affine parameters includes the plurality of the affine parameters. The subblock size is one of: the width of the affine subblock, the height of the affine subblock, the width of the affine PROF subblock, the height of the affine PROF subblock, the width of the gradient subblock, and the height of the gradient subblock. The interpolation filter type is one of: (i) the first interpolation filter (e.g., the 6-tap interpolation filter) for the horizontal interpolation, (ii) the second interpolation filter (e.g., the 8-tap interpolation filter) for the horizontal interpolation, (iii) the first interpolation filter (e.g., the 6-tap interpolation filter) for the vertical interpolation, and (iv) the second interpolation filter (e.g., the 8-tap interpolation filter) for the vertical interpolation.

The subblock characteristic can be determined based on the maximum absolute value of the plurality of the affine parameters and a threshold. In an embodiment, in response to the maximum absolute value being larger than the threshold, the subblock characteristic can be determined to indicate one of: (i) the subblock size being the first size (e.g., 4 samples), (ii) the interpolation filter type being the first interpolation filter (e.g., the 6-tap interpolation filter) for the horizontal interpolation, and (iii) the interpolation filter type being the first interpolation filter (e.g., the 6-tap interpolation filter) for the vertical interpolation. In response to the maximum absolute value being less than or equal to the threshold, the subblock characteristic can be determined to indicate one of: (i) the subblock size being the second size (e.g., 8 samples), (ii) the interpolation filter type being the second interpolation filter (e.g., the 8-tap interpolation filter) for the horizontal interpolation, and (iii) the interpolation filter type being the second interpolation filter (e.g., the 8-tap interpolation filter) for the vertical interpolation.

In an embodiment, in response to the maximum absolute value being larger than or equal to the threshold, the subblock characteristic can be determined to indicate one of: (i) the subblock size being 4 samples, (ii) the interpolation filter type being the 6-tap interpolation filter for the horizontal interpolation, and (iii) the interpolation filter type being the 6-tap interpolation filter for the vertical interpolation. In response to the maximum absolute value being less than the threshold, the subblock characteristic can be determined to indicate one of: (i) the subblock size being more than 4 samples, (ii) the interpolation filter type being the 8-tap interpolation filter for the horizontal interpolation, and (iii) the interpolation filter type being the 8-tap interpolation filter for the vertical interpolation.

A width of an affine subblock can be set based on one or more affine parameters. In one embodiment, for the CB, when a maximum of the absolute values of the affine parameters a and b (e.g., denoted as max_param_hor=max{|a|, |b|}) is larger than the threshold, the width of the affine subblock may be set to 4 samples (e.g., 4 luma samples). Otherwise, when max_param_hor is equal to or smaller than the threshold, the width of the affine subblock may be set to K samples (e.g., luma samples). In an example, K is larger than 4, such as 8. In one embodiment, for the CB, when the maximum of the absolute values of the affine parameters a and b is larger than or equal to the threshold, the width of the affine subblock may be set to 4 samples (e.g., 4 luma samples). Otherwise, when max_param_hor is smaller than the threshold, the width of the affine subblock may be set to K samples (e.g., luma samples). In an example, K is larger than 4, such as 8.

A height of an affine subblock can be set based on one or more affine parameters. In an embodiment, for the CB, when a maximum of the absolute values of the affine parameters c and d (e.g., denoted as max_param_ver=max{|c|, |d|}) is above the threshold, the height of the affine subblock may be set to 4 samples. Otherwise, when max_param_hor is equal to or below the threshold, the height of the affine subblock may be set to K samples. In an example, K is larger than 4, such as 8. In an embodiment, for the CB, when the maximum of the absolute values of the affine parameters c and d is above or equal to the threshold, the height of the affine subblock may be set to 4 samples. Otherwise, when max_param_hor is below the threshold, the height of the affine subblock may be set to K samples. In an example, K is larger than 4, such as 8.

A width and a height of an affine subblock can be set separately based on a first subset and a second subset of the affine parameters, respectively. Alternatively, an area including the width and the height of the affine subblock can be set based on one or more of the affine parameters.

An interpolation filter (e.g., first and second interpolation filters including different numbers of taps) can be set based on one or more affine parameters. In one embodiment, for the CB, when the maximum of the absolute values of affine parameters a and b is above the threshold, the subblock-based affine motion compensation (e.g., the subblock-based affine motion compensation for a luma block) may use the 6-tap interpolation filter (e.g., a 6-tap interpolation filter for luma samples) for the horizontal interpolation. Otherwise, when max_param_hor is equal to or below the threshold, the subblock-based affine motion compensation may use the 8-tap interpolation filter for the horizontal interpolation. In one embodiment, for the CB, when the maximum of the absolute values of affine parameters a and b is above or equal to the threshold, the subblock-based affine motion compensation may use the 6-tap interpolation filter for the horizontal interpolation. Otherwise, when max_param_hor is below the threshold, the subblock-based affine motion compensation may use the 8-tap interpolation filter for the horizontal interpolation.

In one embodiment, for the CB, when the maximum of the absolute values of the affine parameters c and d is above the threshold, the subblock-based affine motion compensation (e.g., the subblock-based affine motion compensation for the luma block) may use the 6-tap interpolation filter (e.g., the 6-tap interpolation filter for luma samples) for the vertical interpolation. Otherwise, when max_param_ver is equal to or below the threshold, the subblock-based affine motion compensation may use the 8-tap interpolation filter for the vertical interpolation. In one embodiment, for the CB, when the maximum of the absolute values of the affine parameters c and d is above or equal to the threshold, the subblock-based affine motion compensation may use the 6-tap interpolation filter for the vertical interpolation. Otherwise, when max_param_ver is below the threshold, the subblock-based affine motion compensation may use the 8-tap interpolation filter for the vertical interpolation.

A width of an affine PROF subblock can be set based on one or more affine parameters. In one embodiment, for the CB, when the maximum of the absolute values of the affine parameters a and b is above the threshold, the affine PROF may be performed based on the width of the affine PROF subblock being 4 samples (e.g., luma samples). Otherwise, when max_param_hor is equal to or below the threshold, the affine PROF may be performed based on width of the affine PROF subblock being K samples (e.g., luma samples). In an example, K is larger than 4, such as 8. In one embodiment, for the CB, when the maximum of the absolute values of the affine parameters a and b is above or equal to the threshold, the affine PROF may be performed based on the width of the affine PROF subblock being 4 samples (e.g., luma samples). Otherwise, when max_param_hor is below the threshold, the affine PROF may be performed based on width of the affine PROF subblock being K samples (e.g., luma samples). In an example, K is larger than 4, such as 8.

A height of an affine PROF subblock can be set based on one or more affine parameters. In an embodiment, for the CB, when the maximum of the absolute values of the affine parameters c and d is above the threshold, the affine PROF may be performed based on the height of the affine PROF subblock being 4 samples (e.g., luma samples). Otherwise, when max_param_hor is equal to or below the threshold, the affine PROF may be performed based on the height of the affine PROF subblock being K samples. In an example, K is larger than 4, such as 8. In an embodiment, for the CB, when the maximum of the absolute values of the affine parameters c and d is above or equal to the threshold, the affine PROF may be performed based on the height of the affine PROF subblock being 4 samples (e.g., luma samples). Otherwise, when max_param_hor is below the threshold, the affine PROF may be performed based on the height of the affine PROF subblock being K samples. In an example, K is larger than 4, such as 8.

A width and a height of an affine PROF subblock can be set separately based on a first subset and a second subset of the affine parameters, respectively. Alternatively, an area including the width and the height of the affine PROF subblock can be set based on one or more of the affine parameters.

In an embodiment, such as in a bi-prediction mode, a bi-prediction signal $P_{bi\text{-}pred}$ can be generated by averaging two prediction signals (e.g., a first signal $P_0$ and a second signal $P_1$) obtained from two different reference pictures and/or using two different MVs. The bi-prediction mode can be extended beyond simple averaging to allow weighted averaging of the two prediction signals as shown in Eq. 29.

$$P_{bi\text{-}pred}=((8-wt)*P_0+wt*P_1+4)>>3 \qquad (Eq.\ 29)$$

where the parameter wt represents a weight for the second signal $P_1$ while a weight for the first signal $P_0$ is (8-wt).

In an embodiment, five weights can be allowed in the bi-prediction with weighted averaging, such as wt ∈ {-2, 3, 4, 5, 10}. For each bi-predicted CU (e.g., a CU that is coded using the bi-prediction mode), the weight wt can be determined in one of two ways: (i) for a non-merge CU (e.g., a CU not coded with the merge mode), the weight index can be signalled after the MV difference; (ii) for a merge CU (e.g., a CU coded with the merge mode), the weight index can be inferred from neighbouring block(s) based on the merge candidate index. In some examples, bi-prediction with CU-level weight (BCW) is only applied to CUs with 256 or more luma samples (e.g., a CU width×a CU height≥256). For low-delay pictures, the five weights (e.g., wt ∈ {-2, 3, 4, 5, 10}) can be used. In an example, for non-low-delay pictures, only three weights (e.g., w ∈{3, 4, 5}) are used.

At an encoder, fast search algorithms can be applied to find the weight index without significantly increasing the encoder complexity. In an example, when combined with AMVR, unequal weights are only conditionally checked for 1-pel and 4-pel MV precisions when the current picture is a low-delay picture. In an example, when combined with affine, affine motion estimation is performed for unequal weights if and only if the affine mode is selected as the current best mode. In an example, when the two reference pictures in the bi-prediction mode are the same, unequal weights are only conditionally checked. In an example, unequal weights are not searched when certain conditions are met, depending on a POC distance between current picture and reference pictures, the coding QP, and the temporal level. In an example, the BCW weight index is coded using one context coded bin followed by bypass coded bins. The first context coded bin can indicate if an equal weight is used. If unequal weight is used, additional bins can be signalled using bypass coding to indicate which unequal weight is used.

In an embodiment, weighted prediction (WP) can be used to efficiently code video content with fading. WP can allow weighting parameters (e.g., weight(s) and offset(s)) to be signalled for each reference picture in each of the reference picture lists L0 and L1. During motion compensation, the weighting parameters (e.g., the weight(s) and offset(s)) of the corresponding reference picture(s) can be applied.

In some examples, WP and BCW are designed for different types of video content. In an example, when WP is used for a CU, a BCW weight index is not signalled, and a weight (e.g., wt) can be inferred to be 4 (e.g., an equal weight is applied). For a merge CU (e.g., a CU coded in the merge mode), the weight index can be inferred from neighbouring blocks based on the merge candidate index. The above description can be applied to the merge mode and an inherited affine merge mode. For a constructed affine merge mode, the affine motion information can be constructed based on the motion information of up to three blocks. The BCW index for a CU coded with the constructed affine merge mode can be set to be equal to the BCW index of the first CPMV.

WP can include weighted uni-prediction and weighted bi-prediction. In some examples, according to WP, the inter prediction signal P is replaced by a linear weighted prediction signal P' (with weight w and offset o) as P'=w×P+o for uni-prediction (e.g., weighted uni-prediction). For weighted bi-prediction, inter prediction signal P0 is for reference L0, weight w0 and offset o0 are for the reference L0, and inter prediction signal P1 is for reference L1, weight w1 and offset of are for the reference L0, then the linear weighted prediction signal P' can be calculated as P'=(w0×P0+o0+w1×P1+o1)/2.

According to aspects of the disclosure, coding information of the CB can be decoded from a coded video bitstream and can indicate WP for the CB. In an embodiment, whether to use the PROF on the CB can be determined based on a type of WP. The type of WP can refer to a weighted bi-prediction, a weighted uni-prediction, or the like. In an embodiment, the weighted bi-prediction includes a weighted bi-prediction with unequal weights or with equal weights. In an embodiment, the weighted bi-prediction includes weighted bi-prediction with weights signaled at any suitable level (e.g., a slice level, a picture level, a CU level).

In response to the type of WP being one of at least one type for disallowing the PROF, the CB can be reconstructed based on the WP without the PROF. Thus, the PROF is not allowed for the CB. In an example, the at least one type for disallowing the PROF includes the weighted bi-prediction. In an example, the at least one type for disallowing the PROF includes the weighted bi-prediction and a weighted uni-prediction.

According to aspects of the disclosure, whether to use a PROF process for a CB can be determined based on an inter prediction mode for the CB. The coding information of the CB can be decoded from a coded video bitstream and can indicate the inter prediction mode for the CB. A usage of the PROF on the CB can be determined based on the inter prediction mode where the inter prediction mode can indicate whether at least one of: (i) weighted prediction (WP) and (ii) a uni-prediction (or a uni-prediction mode) or a bi-prediction (or a bi-prediction mode) is used for the CB. When the PROF is determined to be used for the CB, the CB can be reconstructed according to the inter prediction mode with the PROF. When the PROF is determined not to be used for the CB, the CB can be reconstructed according to the inter prediction mode without the PROF.

To keep low complexity, simultaneously applying multiple methods that employ pixel level multiplications (except for interpolation) to a CB can be disallowed. In an embodiment, whether the PROF can be applied to the block can be determined based on a usage of a prediction process, such as WP (e.g., weighted uni-prediction, weighted bi-prediction). The determination can be based on whether one or more types of prediction processes (one or more weighted prediction types) are used. In an example, calculations in the PROF include sample (or pixel) level multiplications that are not related to interpolations. Thus, when the inter prediction mode indicates the usage of a prediction process that also includes non-interpolation related sample level multiplications, the PROF is determined not to be applied to the block (e.g., the PROF is disabled for the block).

In an embodiment, the PROF and WP are not allowed to be applied to a same block (e.g., the CB). WP can refer to weighted bi-prediction, weighted uni-prediction, and/or the like.

In an example, the bi-predicted PROF and WP are not allowed in the block. Thus, the PROF and WP cannot be both applied to the block when the block is bi-predicted.

In an example, the uni-predicted PROF and WP are allowed to be applied to the same block. Thus, the PROF and WP can be applied to the same block when the block is un-predicted.

In an embodiment, PROF and BCW are not allowed to be applied to the same block.

In an embodiment, when a weighted bi-prediction with unequal weighting is applied on the block that is affine coded, the PROF (or affine PROF) is disabled for the block. In an example, the weighted bi-prediction includes BCW, slice or picture level unequal weighted prediction (UWP), and any applicable unequal weighted bi-prediction signaled at a level that is higher than a block level.

In an embodiment, when WP (e.g., weighted uni-prediction) is applied to the block and an affine uni-prediction (e.g., affine motion model and uni-prediction) is applied to the block, PROF can be applied to the block.

In an embodiment, when WP (e.g., weighted uni-prediction) is applied to the block and an affine uni-prediction is applied to the block, PROF can be disabled for the block.

Figure 19:
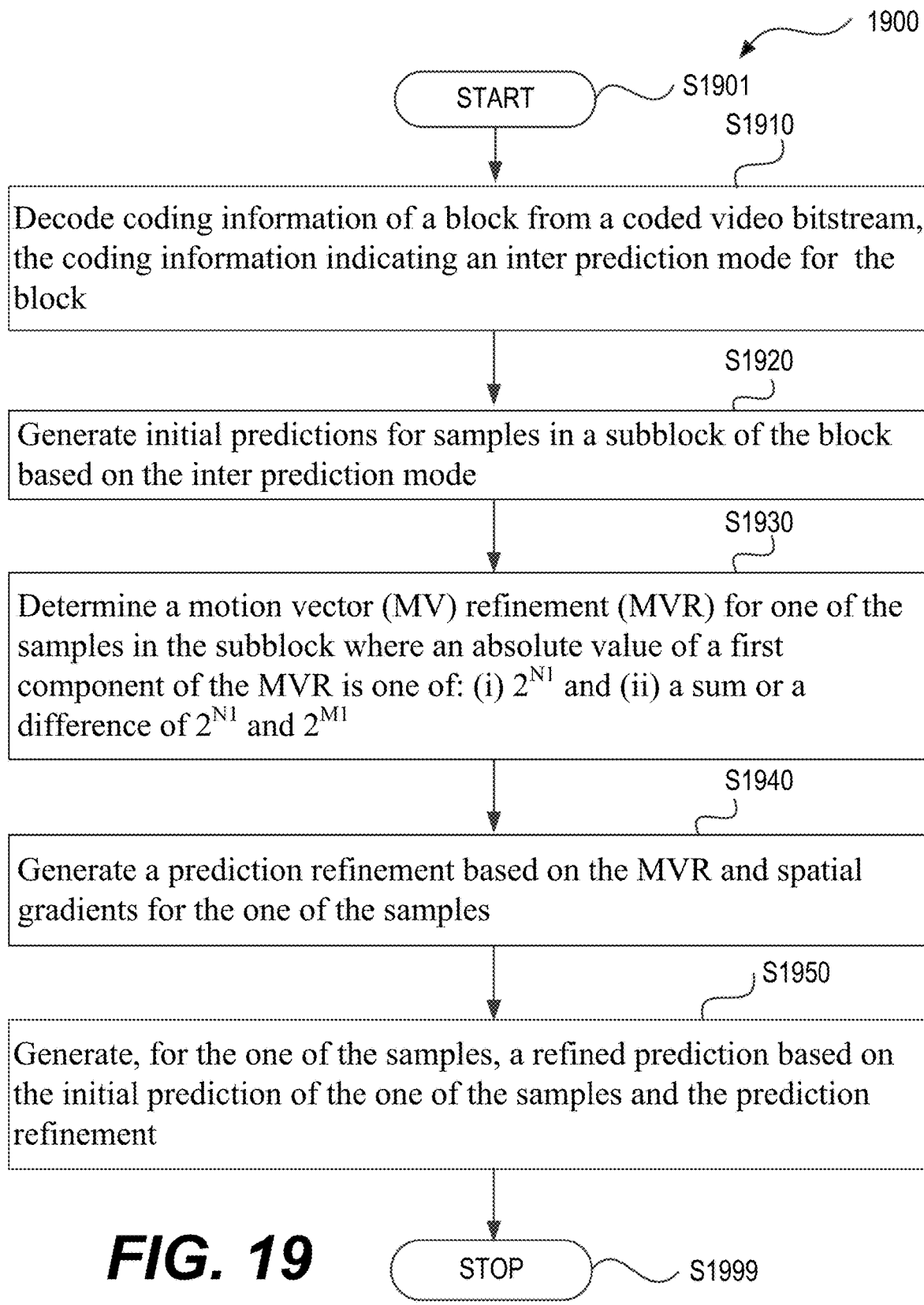
FIG. 19 shows a flow chart outlining a process (1900) according to an embodiment of the disclosure.

FIG. 19 shows a flow chart outlining a process (1900) according to an embodiment of the disclosure. The process (1900) can be used in the reconstruction of a block (e.g., a CB), so to generate a prediction block for the block under reconstruction. The term block may be interpreted as a prediction block, a CB, a luma CB, a CU, a PU, or the like. In various embodiments, the process (1900) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1900) is implemented in software instructions, thus when the processing circuitry executes the software instructions, the processing circuitry performs the process (1900). The process starts at (S1901) and proceeds to (S1910).

At (S1910), coding information of the block can be decoded from a coded video bitstream. The coding information can indicate an inter prediction mode for the block. The block can include a plurality of subblocks having corresponding subblock MVs.

At (S1920), initial predictions for samples in a subblock of the plurality of subblocks can be generated based on the inter prediction mode. In an example, the initial predictions (e.g., I(i, j)) are generated based on the subblock-based affine motion model. In an example, the initial predictions based on $I^{(0)}(x,y)$ and $I^{(1)}(x,y)$ are generated based on a bi-prediction mode.

At (S1930), a MVR for one of the samples in the subblock can be determined. The MVR can include two MVR components (e.g., an x component (or an x MVR component), a y component (or a y MVR component)). An absolute value of one of the MVR components can be one of: (i) $2^{N1}$ and (ii) a sum or a difference of $2^{N1}$ and $2^{M1}$. N1 and M1 can be any suitable integers as described above. Accordingly, the one of the MVR components can be a power of 2, e.g., $2^{N1}$ or $-2^{N1}$. Alternatively, the one of the MVR components can be a sum or a difference of multiple powers of 2, e.g., $2^{N1}+2^{M1}$, $-2^{N1}-2^{M1}$, $-2^{N1}+2^{M1}$, or $2^{N1}-2^{M1}$. In an example, the one of the MVR components can be a sum or a difference of more than two powers of 2, e.g., $2^2+2^{-2}-2^1$.

The two MVR components can include a first component of the MVR and a second component of the MVR. An absolute value of the first component of the MVR can be one of: (i) $2^{N1}$ and (ii) a sum or a difference of $2^{N1}$ and $2^{M1}$. The first component of the MVR can be in a first direction that is one of an x direction and a y direction, and thus the first component of the MVR can be the x component or the y component. In some examples, an absolute value of the second component of the MVR can be one of: (i) $2^{N2}$ and (ii) a sum or a difference of $2^{N2}$ and $2^{M2}$. The second component of the MVR can be in a second direction that is another one of the x direction and the y direction.

As described above, restricting at least one of the MVR components to a power of 2 or multiple powers of 2 can reduce computational complexity, for example, when the MVR components are used in multiplications/divisions. When one of the MVR components is restricted to a power of 2 or multiple powers of 2, a multiplication/division of the one of the MVR components can be replaced by shifting operation(s). For multiple powers of 2, addition(s)/subtraction(s) can be used. Since shifting operation(s) and addition(s)/subtraction(s) are more efficient than multiplications/divisions, the computational complexity can be reduced by restricting the at least one of the MVR components to a power of 2 or multiple powers of 2. In an example, using multiple powers of 2 to represent one of the MVR components increases the accuracy.

As described above, an initial MVR can be determined for the one of the samples in the subblock based on the inter prediction mode (e.g., the inter prediction mode indicates the subblock-based affine motion model, the bi-prediction mode). Subsequently, a first component of the initial MVR can be rounded to be the first component of the MVR. In an example, the second component (e.g., a y component) of the initial MVR is rounded to be the second component of the MVR.

In an embodiment, the first component of the MVR is $2^{N1}$ or $-2^{N1}$ when the absolute value of the first component of the initial MVR is one of: (i) no smaller than $1.5 \times 2^{N1-1}$ and less than $1.5 \times 2^{N1}$ and (ii) larger than $1.5 \times 2^{N1-1}$ and no larger than $1.5 \times 2^{N1}$. In an embodiment, the first component of the MVR is $(2^{N1}+2^{M1})$) or $-(2^{N1}+2^{M1})$.

In an embodiment, as described above, the first component of the initial MVR can be rounded based on a position p of a MSB of the first component of the initial MVR. The position p can be a non-negative integer.

In an example, the absolute value of the first component of the MVR can be obtained as $2^p$ by left-shifting the bit value of 1 (or 1) by p bits as $2^p$. N1 can be equal to p.

In an example, the absolute value of the first component of the initial MVR can be rounded to a nearest power of 2 that is one of: $2^p$ and $2^{p+1}$ by left-shifting a bit value of 1 (or 1) by p or (p+1) bits. Accordingly, the absolute value of the first component of the MVR can be $2^p$ or $2^{p+1}$. For example, whether the absolute value of the first component of the initial MVR is larger than $1.5 \times 2^P$ can be determined. In response to the absolute value of the first component of the initial MVR being larger than $1.5 \times 2^P$, the absolute value of the first component of the MVR can be obtained as $2^{p+1}$ by left-shifting the bit value of 1 (or 1) by (p+1) bits. In response to the absolute value of the first component of the initial MVR being not larger than $1.5 \times 2^P$, the absolute value of the first component of the MVR can be obtained as $2^p$ by left-shifting the bit value of 1 (or 1) by p bits.

In an example, the first component of the initial MVR is a ratio of a first value over a second value where the first value and the second value are non-zero integers. The first component of the initial MVR can be rounded based on a first position p1 of a MSB of the first value and a second position p2 of a MSB of the second value. p1 and p2 can be non-negative integers.

At (S1940), a prediction refinement can be generated based on the MVR and spatial gradients for the one of the samples, as described above. The spatial gradients can be based on the initial predictions for the samples. In an embodiment, the spatial gradients include a first spatial gradient in the first direction and a second spatial gradient in the second direction. For example, the first spatial gradient is an x component, such as $$\frac{\partial I^{(k)}}{\partial x}(i, j)$$

(k=0 or 1) for a bi-prediction in the BDOF mode or $g_x(i,j)$ in the PROF.

Further, a first refinement can be determined based on one of: (i) shifting the first spatial gradient by |N1| bits (e.g., when the first component of the MVR is $2^{N1}$ or $-2^{N1}$) and (ii) separately shifting the first spatial gradient by |N1| and |M1| bits respectively (e.g., when the first component of the MVR is a sum or subtraction of $2^{N1}$ or $2^{M1}$) and combining (e.g., adding, subtracting) the shifted first spatial gradients. Similarly, a second refinement can be determined based on one of: (i) shifting the second spatial gradient by |N2| bits (e.g., when the second component of the MVR is $2^{N2}$ or $-2^{N2}$) and (ii) separately shifting the second spatial gradient by |N2| and |M2| bits respectively (e.g., when the second component of the MVR is a sum or subtraction of $2^{N2}$ or $2^{M2}$) and combining (e.g., adding, subtracting) the shifted second spatial gradients. In an example, shifting corresponds to left-shifting when N1, M1, N2, or M2 is larger than 0, and shifting corresponds to right-shifting when N1, M1, N2, or M2 is less than 0. The prediction refinement can be generated based on the first refinement and the second refinement.

At (S1950), for the one of the samples, a refined prediction (e.g., I'(i,j), $\text{pred}_{BDOF}(x,y)$) can be generated based on the initial prediction of the one of the samples and the prediction refinement.

In an example, a reconstructed sample value can be determined based on the refined prediction (e.g., I'(i,j)) and a residue of the one of the samples (e.g., when the residue is non-zero).

The process (1900) can be suitably adapted to various scenarios and steps in the process (1900) can be adjusted accordingly. One or more of the steps in the process (1900) can be adapted, omitted, repeated, and/or combined. Any suitable order can be used to implement the process (1900). Additional step(s) can be added.

Figure 20A:
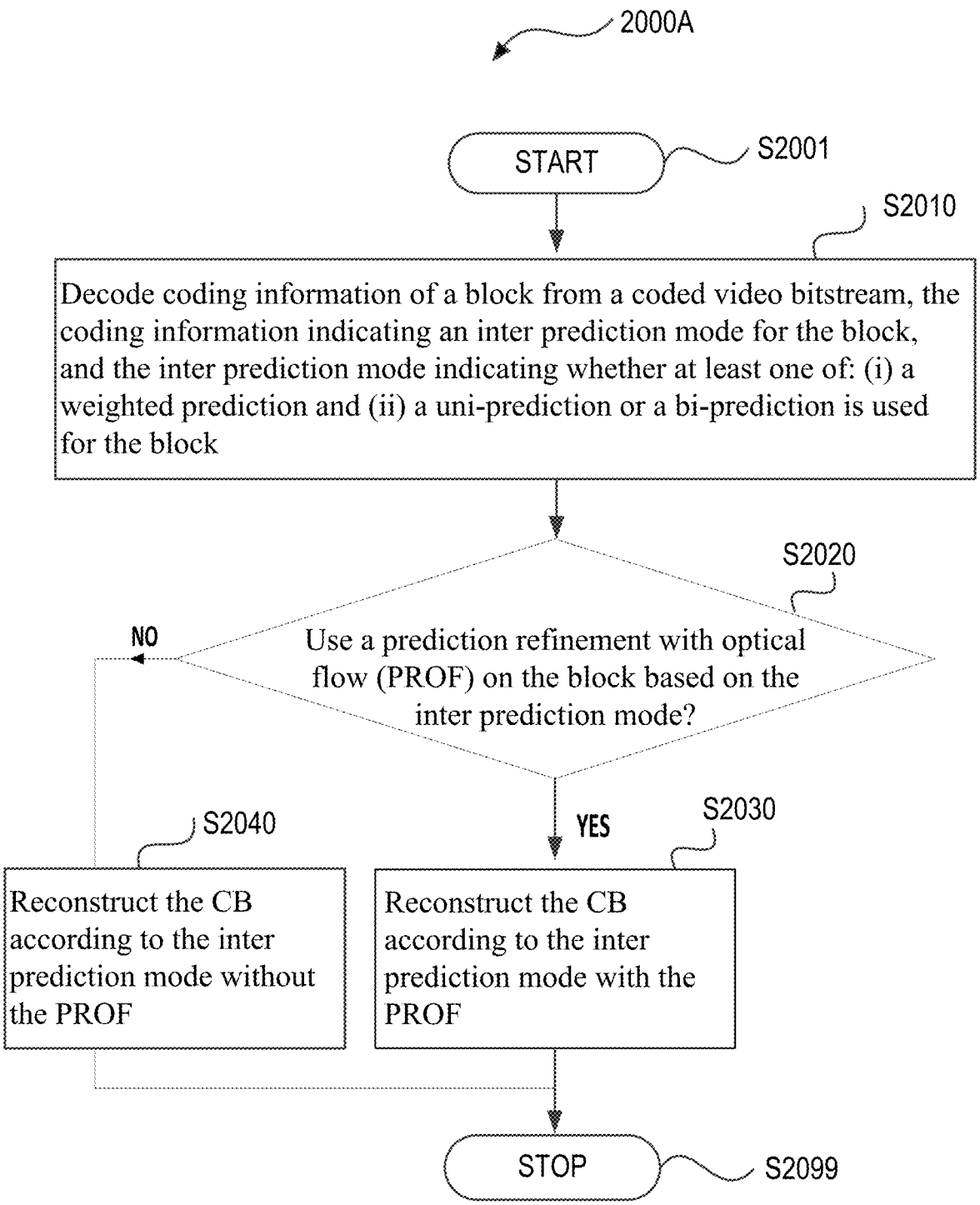
FIG. 20A shows a flow chart outlining a process (2000A) according to an embodiment of the disclosure.

FIG. 20A shows a flow chart outlining a process (2000A) according to an embodiment of the disclosure. The process (2000A) can be used in the reconstruction of a block (e.g., a CB), so to generate a prediction block for the block under reconstruction. The term block may be interpreted as a prediction block, a CB, a luma CB, a CU, a PU, or the like.

In various embodiments, the process (2000A) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (2000A) is implemented in software instructions, thus when the processing circuitry executes the software instructions, the processing circuitry performs the process (2000A). The process starts at (S2001) and proceeds to (S2010).

At (S2010), coding information of the block can be decoded from a coded video bitstream. The coding information can indicate an inter prediction mode for the block. The inter prediction mode can indicate whether at least one of: (i) WP and (ii) a uni-prediction or a bi-prediction is used for the block.

At (S2020), a usage of the PROF on the block (or whether the PROF can be applied on the block) can be determined based on the inter prediction mode. When the PROF is determined to be applied to the block, the process (2000A) proceeds to (S2030). Otherwise, when the PROF is determined not to be applied to the block, the process (2000A) proceeds to (S2040).

In an embodiment, whether the PROF can be applied on the block can be determined based on a usage of one of more prediction processes (or modes), such as WP (e.g., weighted uni-prediction, weighted bi-prediction), bi-prediction, and/or the like. In an example, calculations in the PROF include sample level multiplications that are not related to interpolations. Thus, when the inter prediction mode indicates the usage of at least a prediction process that also includes non-interpolation sample level multiplications, the PROF is determined not be applied to the block (e.g., the PROF is disabled for the block), for example, to reduce computational complexity.

In an embodiment, when the inter prediction mode indicates that WP is applied to the block, the PROF is determined not to be applied to the block.

In an example, when the inter prediction mode indicates that WP and the bi-prediction mode are applied to the block, the PROF is determined not to be applied to the block.

In an example, when the inter prediction mode indicates that WP and the uni-prediction mode are applied to the block, the PROF is determined to be applicable to the block.

In an embodiment, when the inter prediction mode indicates that BCW is applied to the block, the PROF is determined not to be applied to the block.

In an embodiment, when the inter prediction mode indicates that a weighted bi-prediction with unequal weighting is applied on the block that is affine coded, the PROF is disabled for the affine coded block. In an example, the weighted bi-prediction includes BCW, slice or picture level UWP, and an unequal weighted bi-prediction signaled at a level that is higher than a block level.

In an embodiment, when the inter prediction mode indicates that WP (e.g., weighted uni-prediction) is applied to the block and an affine uni-prediction is applied to the block, the PROF is determined to be applicable to the block.

In an embodiment, when the inter prediction mode indicates that WP (e.g., weighted uni-prediction) is applied to the block and an affine uni-prediction is applied to the block, the PROF is determined not to be applied to the block.

At (S2030), the block (or samples in the block) can be reconstructed according to the inter prediction mode with the PROF. The process proceeds to (S2099), and terminates.

At (S2040), the block (or samples in the block) can be reconstructed according to the inter prediction mode without the PROF. The process proceeds to (S2099), and terminates.

The process (2000A) can be suitably adapted to various scenarios and steps in the process (2000A) can be adjusted accordingly. One or more of the steps in the process (2000A) can be adapted, omitted, repeated, and/or combined. Any suitable order can be used to implement the process (2000A). Additional step(s) can be added.

Figure 20B:
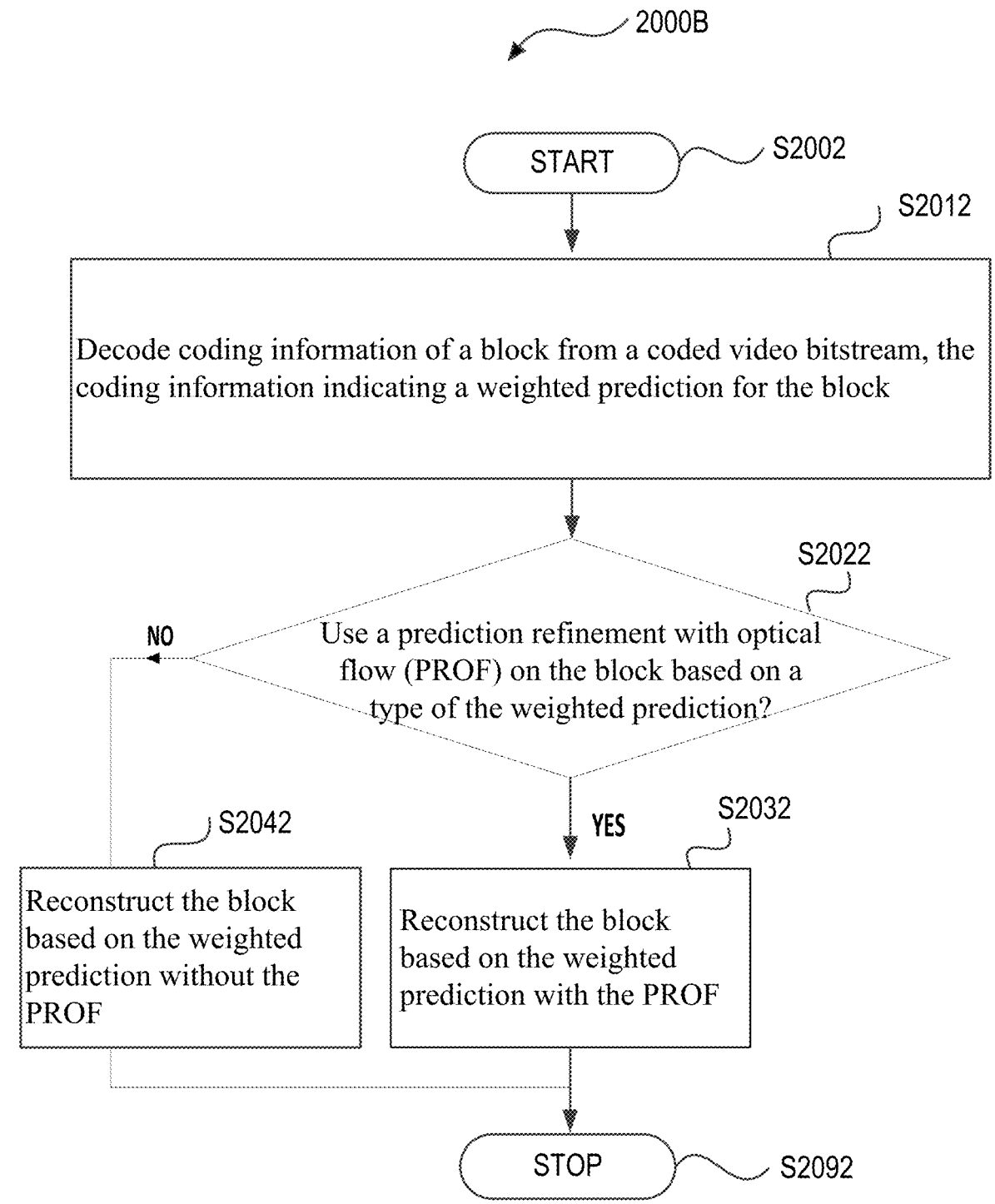
FIG. 20B shows a flow chart outlining a process (2000B) according to an embodiment of the disclosure.

FIG. 20B shows a flow chart outlining a process (2000B) according to an embodiment of the disclosure. The process (2000B) can be used in the reconstruction of a block (e.g., a CB), so to generate a prediction block for the block under reconstruction. The term block may be interpreted as a prediction block, a CB, a luma CB, a CU, a PU, or the like. In various embodiments, the process (2000B) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (2000B) is implemented in software instructions, thus when the processing circuitry executes the software instructions, the processing circuitry performs the process (2000B). The process starts at (S2002) and proceeds to (S2012).

At (S2012), coding information of the block can be decoded from a coded video bitstream. The coding information can indicate a weighted prediction for the block.

At (S2022), whether to use the PROF on the block can be determined based on a type of the weighted prediction. As described above, the type of WP can refer to a weighted bi-prediction, a weighted uni-prediction, or the like. In an embodiment, the weighted bi-prediction includes a weighted bi-prediction with unequal weights or with equal weights. In an embodiment, the weighted bi-prediction includes weighted bi-prediction with weights signaled at any suitable level (e.g., a slice level, a picture level, a CU level).

In response to the type of the weighted prediction being one of at least one type for disallowing the PROF, the PROF is determined not to be applied to the block and the process (2000B) proceeds to (S2042). Otherwise, the PROF is determined to be applied to the block, and the process (2000B) proceeds to (S2032). In an example, the at least one type for disallowing the PROF includes the weighted bi-prediction. In an example, the at least one type for disallowing the PROF includes the weighted bi-prediction and a weighted uni-prediction.

In an embodiment, the at least one type for disallowing the PROF includes WP, and the PROF is determined not to be applied to the block.

In an example, the at least one type for disallowing the PROF includes the weighted bi-prediction. When the type of WP is weighted bi-prediction, the PROF is determined not to be applied to the block. When the type of WP is weighted uni-prediction, the PROF is determined to be applicable to the block.

In an embodiment, the at least one type for disallowing the PROF includes BCW. When the type of WP indicates BCW, the PROF is determined not to be applied to the block.

In an embodiment, the at least one type for disallowing the PROF includes a weighted bi-prediction with unequal weighting. When the type of WP is the weighted bi-prediction with unequal weighting, the PROF is disabled for the block that is affine coded. In an example, the weighted bi-prediction with unequal weighting includes BCW, slice or picture level UWP, and an unequal weighted bi-prediction signaled at a level that is higher than a block level.

In an embodiment, when the at least one type for disallowing the PROF includes WP (e.g., weighted uni-prediction). When the type of WP is weighted uni-prediction with affine motion model, the PROF is determined not to be applied to the block.

At (S2032), the block (or samples in the block) can be reconstructed based on the weighted prediction with the PROF. The process proceeds to (S2092), and terminates.

At (S2042), the block (or samples in the block) can be reconstructed based on the weighted prediction without the PROF. The process proceeds to (S2092), and terminates.

The process (2000B) can be suitably adapted to various scenarios and steps in the process (2000B) can be adjusted accordingly. One or more of the steps in the process (2000B) can be adapted, omitted, repeated, and/or combined. Any suitable order can be used to implement the process (2000B). Additional step(s) can be added.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 21:
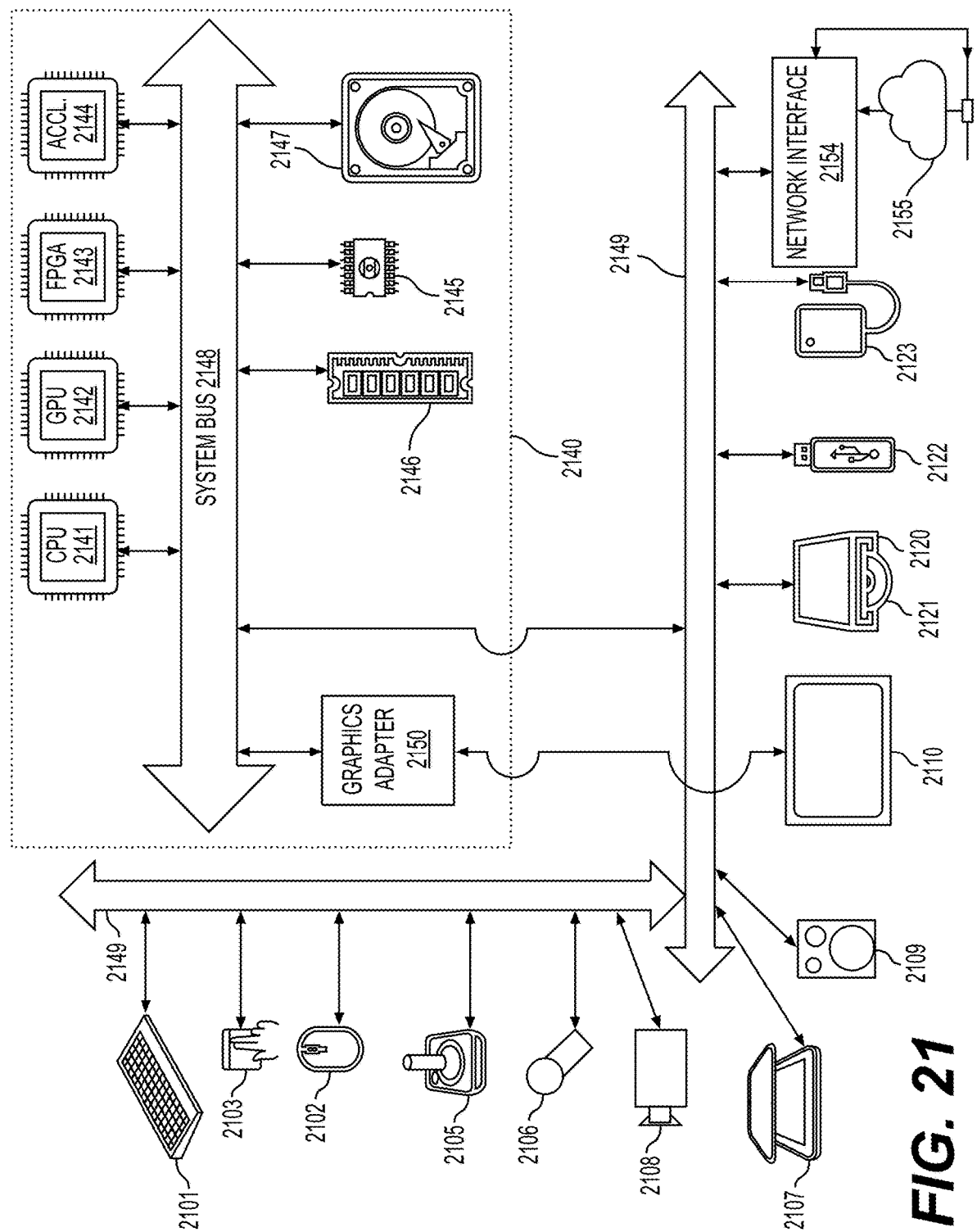
FIG. 21 is a schematic illustration of a computer system in accordance with an embodiment.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch screen (2110), data-glove (not shown), joystick (2105), microphone (2106), scanner (2107), camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as screens (2110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2100) can also include human accessible storage devices and their associated media such as optical media including CD/DVD ROM/RW (2120) with CD/DVD or the like media (2121), thumb-drive (2222), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smartphone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators for certain tasks (2144), and so forth. These devices, along with Read-only memory (ROM) (2145), Random-access memory (2146), internal mass storage such as internal non-user accessible hard drives, SSDs, and the like (2147), may be connected through a system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can be also be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2100), and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
HMVP: History-based MVP
MMVD: Merge with MVD
MVD: Motion vector difference
MVP: Motion vector predictor
SbTMVP: Subblock-based TMVP
TMVP: Temporal MVP
VTM: Versatile test model
HDR: High dynamic range
SDR: Standard dynamic range
JVET: Joint Video Exploration Team
SPS: Sequence parameter set
CP: Control Point
CPMV: Control Point Motion Vector
CPMVP: Control Point Motion Vector Prediction
PROF: prediction refinement with optical flow
BDOF: bi-directional optical flow
AMVR: Adaptive motion vector resolution
BWA: Bi-prediction with weighted averaging
DMVR: Decoder side motion vector refinement
CIIP: Combined inter and intra prediction
BCW: Bi-prediction with CU-level Weights
UWP: unequal weighted prediction
TU: truncated unary binarization
AMVP: Affine/Advanced Motion Vector Prediction
SbTMVP: Subblock-based Temporal Motion Vector Prediction While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   decoding coding information of a current block (CB) from a coded video bitstream, the coding information indicating an inter prediction mode for the CB;
   generating initial predictions for samples in a subblock of a plurality of subblocks in the CB based on the inter prediction mode; and
   for one of the samples in the subblock,
     determining a motion vector (MV) refinement (MVR), an absolute value of a first component of the MVR being one of: (i) $2^{N1}$ and (ii) a sum or a difference of $2^{N1}$ and $2^{M1}$, N1 and M1 being integers, the first component of the MVR being in a first direction that is one of an x direction and a y direction;
     generating a prediction refinement based on the MVR and spatial gradients for the one of the samples, the spatial gradients being based on the initial predictions for the samples; and
     generating a refined prediction based on the initial prediction of the one of the samples and the prediction refinement.

2. The method of claim 1, wherein
   the spatial gradients include a first spatial gradient in the first direction and a second spatial gradient in a second direction that is another one of the x direction and the y direction;
   the MVR includes a second component that is in the second direction, an absolute value of the second component of the MVR being one of: (i) $2^{N2}$ and (ii) a sum or a difference of $2^{N2}$ and $2^{M2}$, N2 and M2 being integers; and
   the generating the prediction refinement further includes:
     determining a first refinement based on one of: (i) shifting the first spatial gradient by |N1| bits and (ii) separately shifting the first spatial gradient by |N1| and |M1| bits respectively and combining the shifted first spatial gradients;
     determining a second refinement based on one of: (i) shifting the second spatial gradient by |N2| bits and (ii) separately shifting the second spatial gradient by |N2| and |M2| bits respectively and combining the shifted second spatial gradients; and
     generating the prediction refinement based on the first refinement and the second refinement.

3. The method of claim 1, wherein the determining the MVR further comprises:
   determining an initial MVR for the one of the samples in the subblock based on the inter prediction mode; and
   rounding a first component of the initial MVR to generate the first component of the MVR.

4. The method of claim 3, wherein
   the inter prediction mode is a subblock-based affine motion model with a prediction refinement with optical flow (PROF); and for the one of the samples in the subblock, the determining the initial MVR further includes:
  determining a sample MV of the one of the samples and a subblock MV of the subblock based on the subblock-based affine motion model; and
  determining the initial MVR based the sample MV and the subblock MV.

5. The method of claim 1, wherein the first component of the MVR is $2^{N1}$ or $-2^{N1}$.

6. The method of claim 1, wherein the first component of the MVR is $(2^{N1}+2^{M1})$ or $-(2^{N1}+2^{M1})$.

7. The method of claim 3, wherein the rounding the first component of the initial MVR further comprises:
  rounding the first component of the initial MVR based on a position p of a most significant bit (MSB) of the first component of the initial MVR.

8. The method of claim 7, wherein the rounding the first component of the initial MVR comprises:
  left-shifting a bit value of 1 by p bits to obtain the absolute value of the first component of the MVR as $2^p$, N1 being equal to p.

9. The method of claim 7, wherein the rounding the first component of the initial MVR comprises:
  left-shifting a bit value of 1 by p or (p+1) bits to round an absolute value of the first component of the initial MVR to a nearest power of 2 that is one of: $2^p$ and $2^{p+1}$.

10. The method of claim 3, wherein
  the first component of the initial MVR is a ratio of a first value over a second value, the first value and the second value being non-zero integers; and
  the rounding the first component of the initial MVR further includes rounding the first component of the initial MVR based on a first position p1 of a MSB of the first value and a second position p2 of a MSB of the second value.

11. An apparatus for video decoding, comprising processing circuitry configured to:
  decode coding information of a current block (CB) from a coded video bitstream, the coding information indicating an inter prediction mode for the CB;
  generate initial predictions for samples in a subblock of a plurality of subblocks in the CB based on the inter prediction mode; and
  for one of the samples in the subblock,
    determine a motion vector (MV) refinement (MVR), an absolute value of a first component of the MVR being one of: (i) $2^{N1}$ and (ii) a sum or a difference of $2^{N1}$ and $2^{M1}$, N1 and M1 being integers, the first component of the MVR being in a first direction that is one of an x direction and a y direction;
    generate a prediction refinement based on the MVR and spatial gradients for the one of the samples, the spatial gradients being based on the initial predictions for the samples; and
    generate a refined prediction based on the initial prediction of the one of the samples and the prediction refinement.

12. The apparatus of claim 11, wherein
  the spatial gradients include a first spatial gradient in the first direction and a second spatial gradient in a second direction that is another one of the x direction and the y direction;
  the MVR includes a second component that is in the second direction, an absolute value of the second component of the MVR being one of: (i) $2^{N2}$ and (ii) a sum or a difference of $2^{N2}$ and $2^{M2}$, N2 and M2 being integers; and
  the processing circuitry is further configured to:
    determine a first refinement based on one of: (i) shifting the first spatial gradient by |N1| bits and (ii) separately shifting the first spatial gradient by |N1| and |M1| bits respectively and combining the shifted first spatial gradients;
    determine a second refinement based on one of: (i) shifting the second spatial gradient by |N2| bits and (ii) separately shifting the second spatial gradient by |N2| and |M2| bits respectively and combining the shifted second spatial gradients; and
    generate the prediction refinement based on the first refinement and the second refinement.

13. The apparatus of claim 11, wherein the processing circuitry is further configured to:
  determine an initial MVR for the one of the samples in the subblock based on the inter prediction mode; and
  round a first component of the initial MVR to generate the first component of the MVR.

14. The apparatus of claim 13, wherein
  the inter prediction mode is a subblock-based affine motion model with a prediction refinement with optical flow (PROF); and
  for the one of the samples in the subblock, the processing circuitry is configured to:
    determine a sample MV of the one of the samples and a subblock MV of the subblock based on the subblock-based affine motion model; and
    determine the initial MVR based the sample MV and the subblock MV.

15. The apparatus of claim 11, wherein the first component of the MVR is $2^{N1}$ or $-2^{N1}$.

16. The apparatus of claim 11, wherein the first component of the MVR is $(2^{N1}+2^{M1})$ or $-(2^{N1}+2^{M1})$.

17. The apparatus of claim 13, wherein the processing circuitry is further configured to:
  round the first component of the initial MVR based on a position p of a most significant bit (MSB) of the first component of the initial MVR.

18. The apparatus of claim 13, wherein
  the first component of the initial MVR is a ratio of a first value over a second value, the first value and the second value being non-zero integers; and
  the processing circuitry is configured to round the first component of the initial MVR based on a first position p1 of a MSB of the first value and a second position p2 of a MSB of the second value.

* * * * *